(12) United States Patent
Higano

(10) Patent No.: US 12,538,600 B2
(45) Date of Patent: Jan. 27, 2026

(54) IMAGING DEVICE

(71) Applicant: SONY SEMICONDUCTOR SOLUTIONS CORPORATION, Kanagawa (JP)

(72) Inventor: Shun Higano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 369 days.

(21) Appl. No.: 18/261,685

(22) PCT Filed: Dec. 28, 2021

(86) PCT No.: PCT/JP2021/048888
§ 371 (c)(1),
(2) Date: Jul. 17, 2023

(87) PCT Pub. No.: WO2022/163296
PCT Pub. Date: Aug. 4, 2022

(65) Prior Publication Data
US 2024/0079428 A1 Mar. 7, 2024

(30) Foreign Application Priority Data
Jan. 26, 2021 (JP) .............................. 2021-010690

(51) Int. Cl.
*H10F 39/00* (2025.01)
*H10F 39/18* (2025.01)
(52) U.S. Cl.
CPC ....... *H10F 39/8057* (2025.01); *H10F 39/182* (2025.01); *H10F 39/8063* (2025.01)
(58) Field of Classification Search
CPC ............... H10F 39/182; H10F 39/8057; H10F 39/8063; H10F 39/12; H10F 39/8053; H10F 39/807; H04N 23/12; H04N 25/70
See application file for complete search history.

(56) References Cited

U.S. PATENT DOCUMENTS

2011/0156186 A1* 6/2011 Iida ....................... H10F 39/807
257/E31.127
2018/0286906 A1* 10/2018 Sato ..................... H10F 39/182
(Continued)

FOREIGN PATENT DOCUMENTS

JP 2012-114479 A 6/2012
JP 2016139988 A * 8/2016 ........... H04N 25/704
(Continued)

OTHER PUBLICATIONS

International Search Report and Written Opinion of PCT Application No. PCT/JP2021/048888, issued on Feb. 1, 2022, 08 pages of ISRWO.

*Primary Examiner* — Moazzam Hossain
(74) *Attorney, Agent, or Firm* — CHIP LAW GROUP

(57) ABSTRACT

To provide an imaging device that can suppress color mixing between adjacent pixels. An imaging device includes: a plurality of pixels arranged side by side in a direction parallel to one surface of a semiconductor substrate; an inter-pixel separation part provided on the semiconductor substrate and separating adjacent pixels among the plurality of pixels; a color filter provided on the one surface side of the semiconductor substrate; a plurality of convex lenses provided on the one surface side of the semiconductor substrate with the color filter interposed therebetween and arranged side by side in the direction parallel to the one surface; and a concave lens provided on the one surface side of the semiconductor substrate with the color filter and the plurality of convex lenses interposed therebetween. The inter-pixel separation part includes a same-color pixel separation part arranged between adjacent pixels of the same color among a first color pixel, a second color pixel, and a third color pixel, and a different-color pixel separation part arranged between adjacent pixels of different colors among (Continued)

the first color pixel, the second color pixel, and the third color pixel. The different-color pixel separation part has a trench isolation structure.

8 Claims, 33 Drawing Sheets

(56) References Cited

U.S. PATENT DOCUMENTS

2020/0235149 A1\* 7/2020 Shiraishi ................. H10F 39/12
2022/0173150 A1\* 6/2022 Kurose ............... H10F 39/8053

FOREIGN PATENT DOCUMENTS

| JP | 2017-059739 A | 3/2017 |
| JP | 2018-201015 A | 12/2018 |
| JP | 2020-031127 A | 2/2020 |
| JP | 2020-174158 A | 10/2020 |

\* cited by examiner

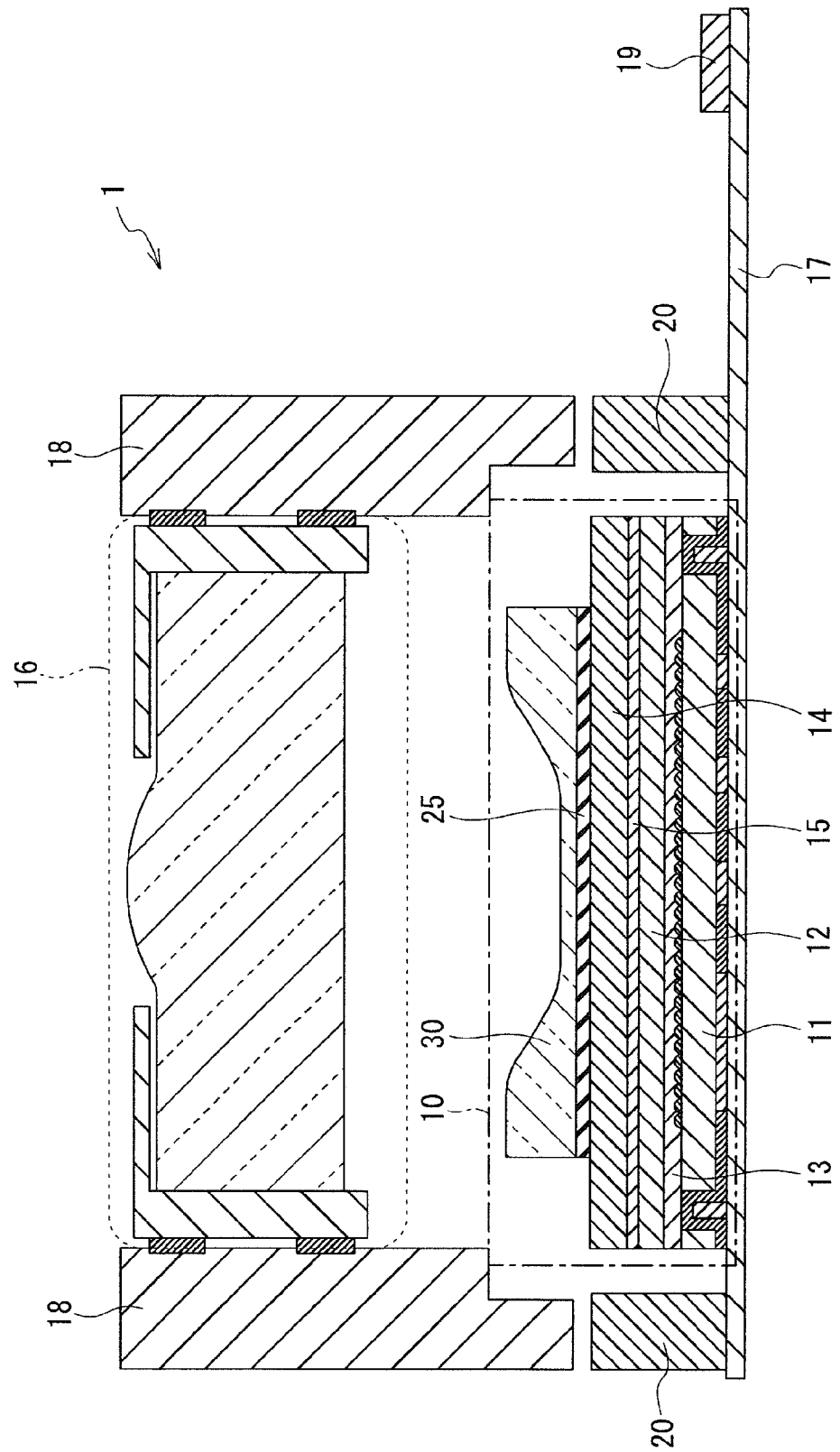

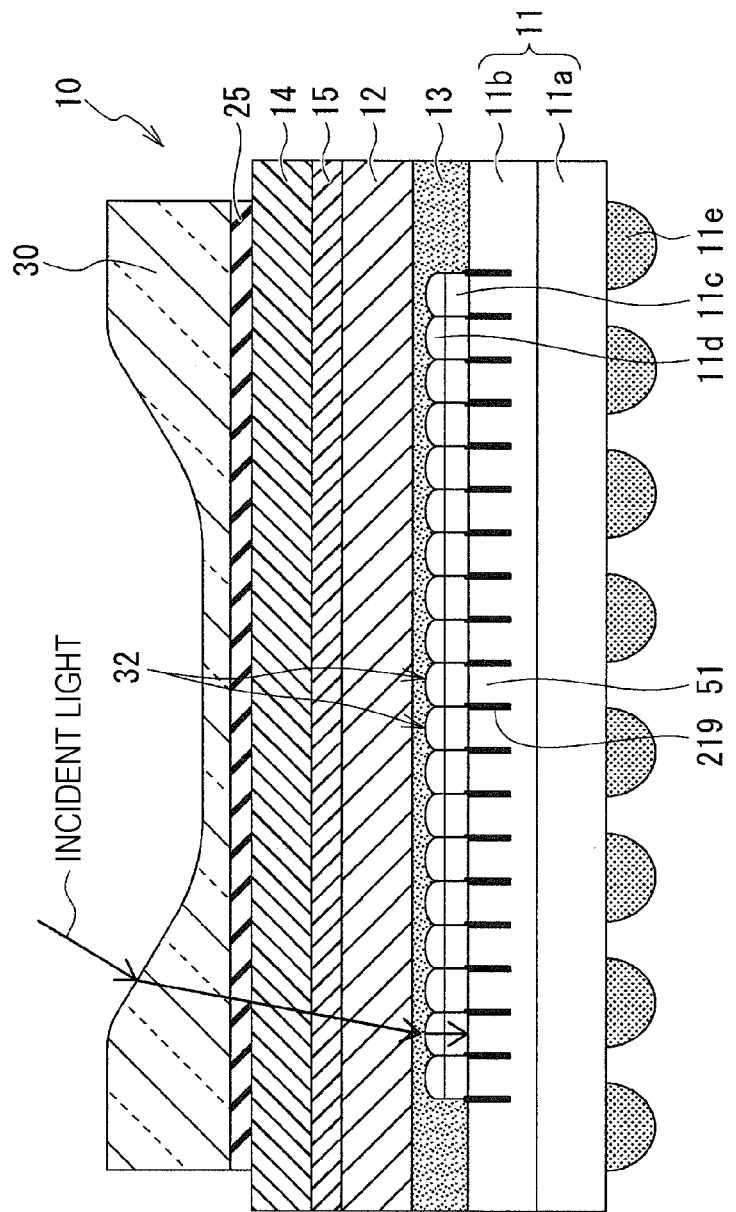

FIG. 16

FIG. 17
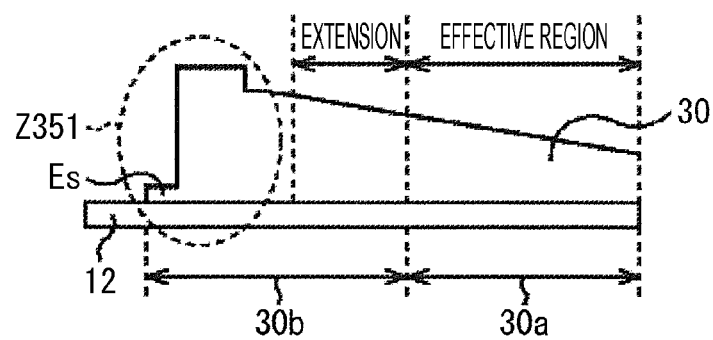
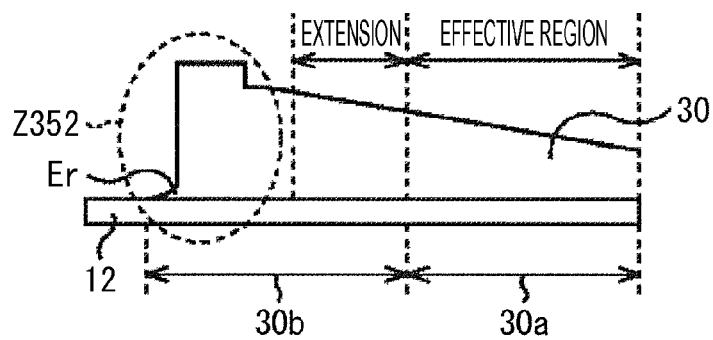

FIG. 18
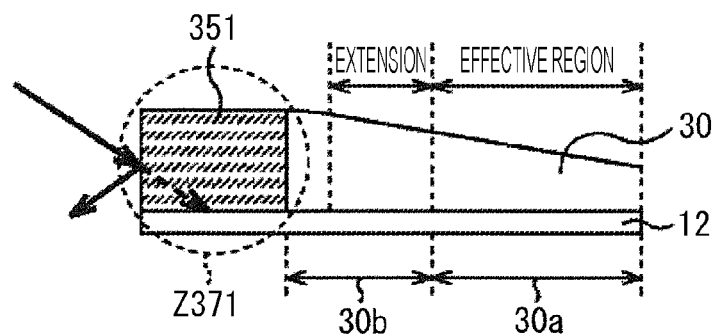
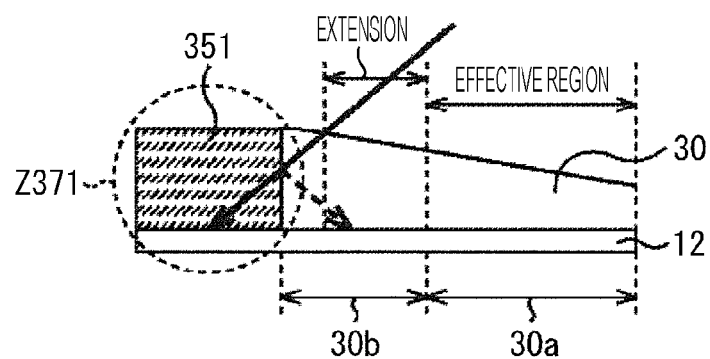

IMAGING DEVICE

CROSS REFERENCE TO RELATED APPLICATIONS

This application is a U.S. National Phase of International Patent Application No. PCT/JP2021/048888 filed on Dec. 28, 2021, which claims priority benefit of Japanese Patent Application No. JP 2021-010690 filed in the Japan Patent Office on Jan. 26, 2021. Each of the above-referenced applications is hereby incorporated herein by reference in its entirety.

TECHNICAL FIELD

The present disclosure relates to an imaging device.

BACKGROUND ART

A structure in which color filters of the same color are arranged across a plurality of pixels in a pixel array is known (see, for example, Patent Document 1). The sensitivity can be improved by adding the plurality of pixels in the dark. In addition, the resolution can be improved by performing remosaicing in the light.

CITATION LIST

Patent Document

Patent Document 1: Japanese Patent Application Laid-Open No. 2017-059739

SUMMARY OF THE INVENTION

Problems to be Solved by the Invention

In each of adjacent pixels of the same color, there is a tendency that the manner of color mixing becomes different due to the influence of different peripheral pixel arrangements. For example, due to the influence of the color mixing, an output difference tends to occur easily between the adjacent pixels of the same color, and the image quality is possibly deteriorated at the time of remosaicing.

The present disclosure has been made in view of such circumstances, and an object thereof is to provide an imaging device that can suppress the color mixing between the adjacent pixels.

Solutions to Problems

An imaging device according to one aspect of the present disclosure includes: a semiconductor substrate; a plurality of pixels provided on the semiconductor substrate and arranged side by side in a direction parallel to one surface of the semiconductor substrate; an inter-pixel separation part provided on the semiconductor substrate and separating adjacent pixels among the plurality of pixels; color filters provided on a side of the one surface of the semiconductor substrate; a plurality of convex lenses provided on the side of the one surface of the semiconductor substrate with the color filters interposed between the plurality of convex lenses and the semiconductor substrate, and arranged side by side in the direction parallel to the one surface; and a concave lens provided on the side of the one surface of the semiconductor substrate with the color filters and the plurality of convex lenses interposed between the concave lens and the semiconductor substrate. The plurality of pixels includes a first color pixel in which a first color filter among the color filters is arranged, a second color pixel in which a second color filter among the color filters is arranged, and a third color pixel in which a third color filter among the color filters is arranged. The inter-pixel separation part includes a same-color pixel separation part arranged between adjacent pixels of the same color among the first color pixel, the second color pixel, and the third color pixel, and a different-color pixel separation part arranged between adjacent pixels of different colors among the first color pixel, the second color pixel, and the third color pixel. The different-color pixel separation part has a trench isolation structure.

With this arrangement, the concave lens can relax the incident angle of light incident on a pixel on the high image height side (that is, a pixel arranged at a position away from the central part of a pixel region), and can bring the incident angle on the high image height side close to 0° (that is, perpendicular to a light receiving surface). Therefore, the color mixing between the adjacent pixels can be suppressed on the high image height side. Furthermore, because the adjacent different color pixels are separated by the trench isolation structure, the color mixing can be further suppressed.

BRIEF DESCRIPTION OF DRAWINGS

FIG. 1 is a cross-sectional view illustrating a configuration example of an imaging device according to a first embodiment of the present disclosure.

FIG. 2 is a cross-sectional view illustrating a configuration example of an integrated configuration part according to the first embodiment of the present disclosure.

FIG. 16 is a view illustrating configuration examples (part 1) of an end part of a WL lens 30.

FIG. 17 is a view illustrating configuration examples (part 2) of the end part of the WL lens 30.

FIG. 18 is a view illustrating configuration examples (part 3) of the end part of the WL lens 30.

MODE FOR CARRYING OUT THE INVENTION

Figure 3A:
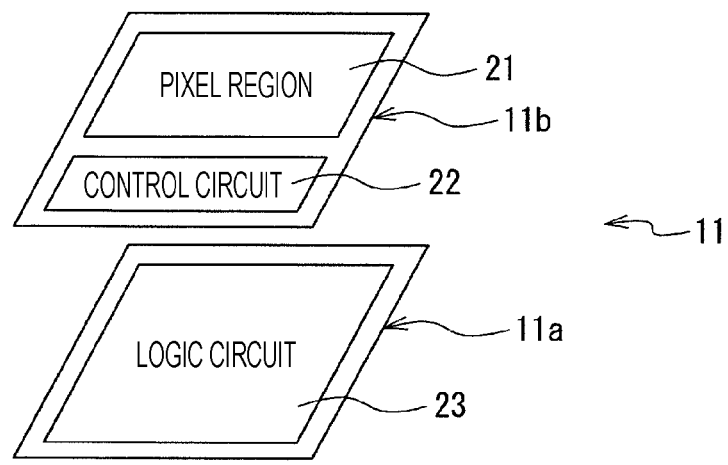
FIG. 3A is a schematic view illustrating a configuration example of the integrated configuration part.

Hereinafter, embodiments of the present disclosure are described with reference to the drawings. In the illustration of the drawings referred to in the following description, the same or similar portions are denoted by the same or similar reference signs. It should be noted that the drawings are schematic, and a relationship between a thickness and a planar dimension, a ratio of the thicknesses of layers, and the like are different from actual ones. Therefore, specific thicknesses and dimensions should be determined in consideration of the following description. Furthermore, it goes without saying that dimensional relationships and ratios are partly different among the drawings.

Definition of directions such as upward and downward directions in the following description is merely the definition for convenience of description, and does not limit the technical idea of the present disclosure. For example, it is a matter of course that when an object is observed by rotating the object by 90°, the up and down are converted into and read as left and right, and when the object is observed by rotating the object by 180°, the up and down are inverted before being read.

Furthermore, in the following description, "plan view" means, for example, viewing from a thickness direction (that is, the normal direction of the front surface or the back surface) of a silicon substrate 101 described later.

In the following description, there is a case where + or − is added as for p or n indicating a conductivity type of a semiconductor region. The semiconductor region to which + or − is added means that an impurity concentration thereof is relatively higher or lower than that of the semiconductor region to which + or − is not added. However, even in the semiconductor regions to which the same p and p (or n and n) are added, it does not mean that the impurity concentrations of the semiconductor regions are exactly the same.

First Embodiment (Imaging Device)

FIG. 1 is a cross-sectional view illustrating a configuration example of an imaging device 1 according to a first embodiment of the present disclosure. The imaging device 1 in FIG. 1 includes a solid-state imaging element 11, a glass substrate 12, an infrared cut filter (IRCF) 14, a wafer-level lens 30, a lens group 16, a circuit board 17, an actuator 18 (an example of a "holding unit" of the present disclosure), a connector 19, a spacer 20, and a wafer-level lens 30 (hereinafter, referred to as a WL lens; an example of a "concave lens" of the present disclosure).

The solid-state imaging element 11 includes the so-called charge coupled device (CCD), complementary metal oxide semiconductor (CMOS), and the like, and is fixed on the circuit board 17 in an electrically connected state. As will be described later with reference to FIG. 4, the solid-state imaging element 11 includes a plurality of pixels arranged in an array, generates a pixel signal corresponding to the amount of incident light condensed and incident from the upper side in the drawing via the lens group 16 and the WL lens 30 in units of pixels, and outputs the pixel signal as an image signal to the outside from the connector 19 via the circuit board 17.

On an upper surface part of the solid-state imaging element 11 in FIG. 1, a glass substrate 12 is provided and bonded thereto by an adhesive (GLUE) 13 that is transparent, that is, has substantially the same refractive index as the glass substrate 12.

On an upper surface part of the glass substrate 12 in FIG. 1, an IRCF 14 that cuts infrared light out of incident light is provided. The IRCF 14 is bonded to the upper surface part of the glass substrate 12 with an adhesive (GLUE) 15 that is transparent and has substantially the same refractive index as the glass substrate 12. The IRCF 14 includes, for example, blue plate glass, and cuts (removes) infrared light. The refractive index of the IRCF 14 is also substantially the same as that of the glass substrate 12.

On an upper surface part of the IRCF 14 in FIG. 1, the WL lens 30 is provided with an adhesive (GLUE) 25 interposed therebetween, the adhesive being transparent and having substantially the same refractive index as the glass substrate 12. The WL lens 30 relaxes the incident angle of the incident light with respect to the light receiving surface of the pixel. The incident angle is an angle with respect to a direction perpendicular to the light receiving surface. Relaxing of the incident angle means that the incident angle approaches 0°. In a case where the incident angle is 0°, the incident light perpendicularly enters the light receiving surface. As described above, the WL lens 30 is a concave lens extending over the plurality of pixels.

The concave surface of the WL lens 30 faces the upper surface side in FIG. 1, that is, the side of the lens group 16. A back surface (back surface in FIG. 1) located on the opposite side of the concave surface of the WL lens 30 is bonded to the upper surface part of the IRCF 14 with the adhesive 25. The WL lens 30 includes glass that is transparent and has substantially the same refractive index as the glass substrate 12. Alternatively, the WL lens 30 may include organic material that is transparent and has substantially the same refractive index as the glass substrate 12. In addition, the WL lens 30 is not limited to colorless and transparent, and may be colored and transparent. The WL lens 30 covers the entire of a pixel region 21 (see, for example, FIGS. 3A and 3B) to be described later and is formed to have a diameter smaller than those of the IRCF 14 and the glass substrate 12 so as not to protrude from the IRCF 14 and the glass substrate 12. Note that the configuration of the WL lens 30 will be described in more detail in a section of a configuration example of the WL lens described later.

The solid-state imaging element 11, the glass substrate 12, the IRCF 14, and the WL lens 30 are laminated and bonded by the transparent adhesives 13, 15, and 25 to be configured integrally, and are connected to the circuit board 17. Note that because the solid-state imaging element 11, the glass substrate 12, the IRCF 14, and the WL lens 30, which are surrounded by a one dot chain line in the drawing, are bonded and integrated by the adhesives 13, 15, and 25 having substantially the same refractive index, the above parts are also simply referred to as an integrated configuration part 10 hereinafter.

Furthermore, the IRCF 14 may be attached onto the glass substrate 12 after being divided in the manufacturing process of the solid-state imaging element 11, or a large sheet of the IRCF 14 may be attached to the entire of the wafer-like glass substrate 12 including a plurality of the solid-state imaging elements 11 and then divided into individual pieces in units of the solid-state imaging elements 11, and any method may be adopted. After the IRCF 14 is attached, the WL lens 30 is bonded thereto.

The spacer 20 is constituted on the circuit board 17 so as to surround the entire structure in which the solid-state imaging element 11, the glass substrate 12, the IRCF 14, and the WL lens 30 are integrally formed. Furthermore, the actuator 18 is provided on the spacer 20. The actuator 18 is configured in a cylindrical shape, incorporates the lens group 16 configured by stacking a plurality of lenses inside the cylinder, and is driven in the vertical direction in FIG. 1.

With such a configuration, by the actuator 18 holding the lens group 16 and moving the held lens group 16 in the vertical direction in FIG. 1 (the front-rear direction with respect to the optical axis) to adjust the focus so as to form an image of a subject on the imaging surface of the solid-state imaging element 11 according to the distance to the not-illustrated subject that is the upper side in the drawing, autofocus is implemented.

(Integrated configuration part) Next, a configuration example of the integrated configuration part 10 will be described with reference to FIGS. 2, 3A, 3B, 4, 5, and 6. FIG. 2 is a cross-sectional view illustrating a configuration example of the integrated configuration part 10 according to the first embodiment of the present disclosure. The integrated configuration part 10 illustrated in FIG. 2 is a semiconductor package in which the solid-state imaging element 11 including a laminated substrate configured by laminating a lower substrate 11a and an upper substrate 11b is packaged.

A plurality of solder balls 11e, which are back electrodes for electrical connection with the circuit board 17 in FIG. 1, are formed on the lower substrate 11a of the laminated substrate constituting the solid-state imaging element 11.

On the upper surface of the upper substrate 11b, color filters 11c of red (R), green (G), and blue (B), and on-chip lenses 11d (an example of a "convex lens" of the present disclosure) are formed. In addition, the upper substrate 11b is connected to the glass substrate 12 for protecting the on-chip lenses 11d with a cavity-less structure with an adhesive 13 including glass seal resin.

Figure 3B:
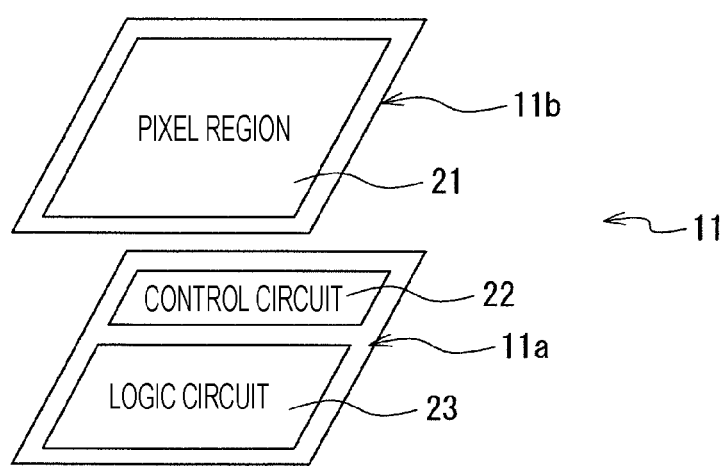
FIG. 3B is a schematic view illustrating a configuration example of the integrated configuration part.

FIGS. 3A and 3B are schematic views illustrating a configuration example of the integrated configuration part 10. For example, on the upper substrate 11b, as illustrated in FIG. 3A, the pixel region 21 in which pixel parts that perform photoelectric conversion are two-dimensionally aligned in an array, and a control circuit 22 that controls the pixel parts are formed. On the lower substrate 11a, a logic circuit 23 such as a signal processing circuit that processes a pixel signal output from the pixel part is formed. Alternatively, as illustrated in FIG. 3B, only the pixel region 21 may be formed on the upper substrate 11b, and the control circuit 22 and the logic circuit 23 may be formed on the lower substrate 11a.

As described above, by forming and laminating the logic circuit 23 or both the control circuit 22 and the logic circuit 23 on the lower substrate 11a different from the upper substrate 11b in the pixel region 21, the size of the imaging device 1 can be reduced as compared with a case where the pixel region 21, the control circuit 22, and the logic circuit 23 are arranged in the planar direction on one semiconductor substrate. In the following description, the upper substrate 11b on which at least the pixel region 21 is formed is referred to as a pixel sensor substrate 11b, and the lower substrate 11a on which at least the logic circuit 23 is formed is referred to as a logic substrate 11a.

(Circuit Configuration of Solid-State Imaging Element)

Figure 4:
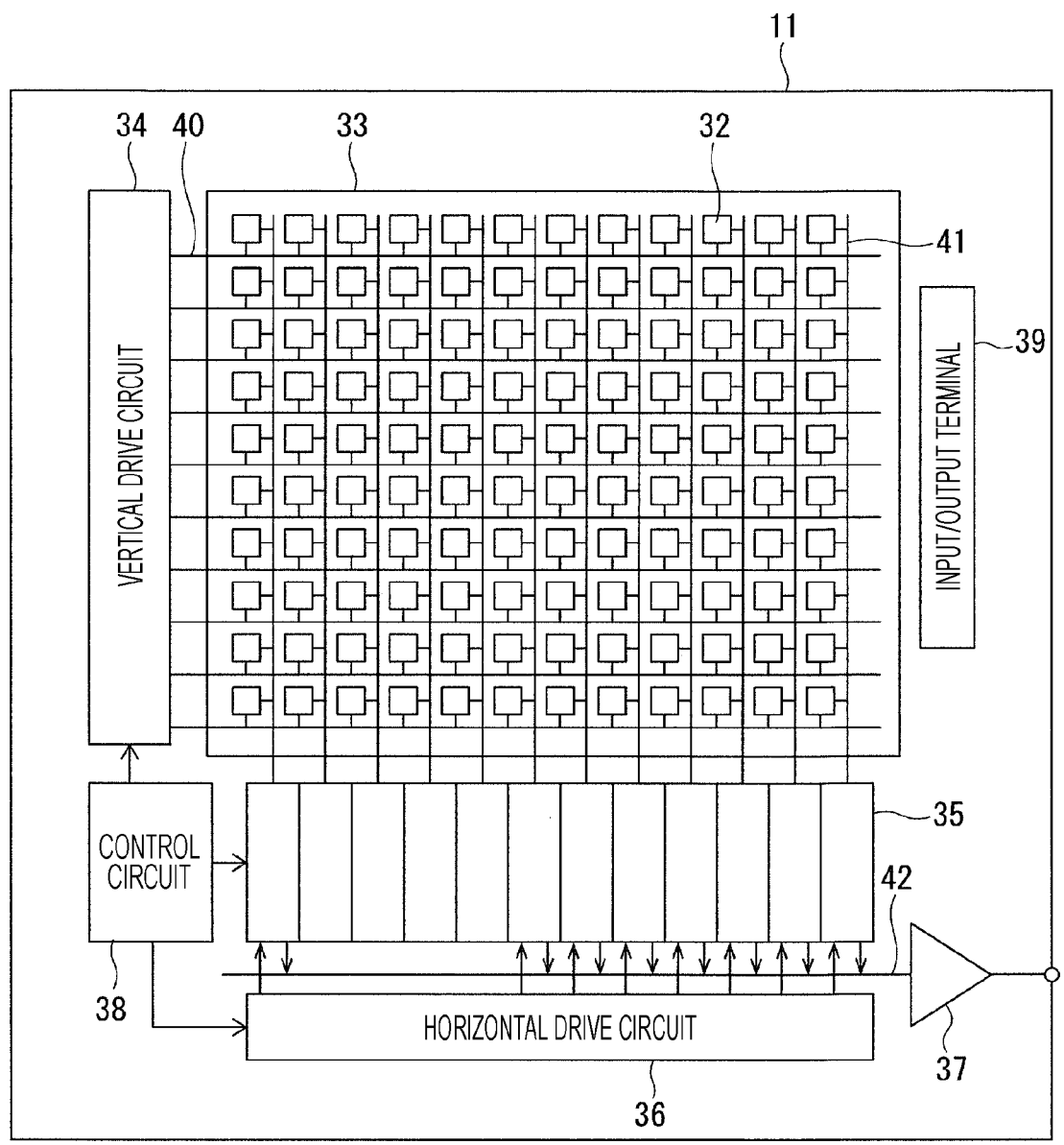
FIG. 4 is a view illustrating a circuit configuration example of a solid-state imaging element according to the first embodiment of the present disclosure.

FIG. 4 is a view illustrating a circuit configuration example of the solid-state imaging element 11 according to the first embodiment of the present disclosure. As illustrated in FIG. 4, the solid-state imaging element 11 includes a pixel array unit 33 in which pixels 32 are arranged in a two-dimensional array, a vertical drive circuit 34, a column signal processing circuit 35, a horizontal drive circuit 36, an output circuit 37, a control circuit 38, and an input/output terminal 39.

The pixel 32 includes a photodiode as a photoelectric conversion element and a plurality of pixel transistors. A circuit configuration example of the pixel 32 will be described later with reference to FIG. 5.

Furthermore, the pixel 32 may have a shared pixel structure. The pixel shared structure includes a plurality of photodiodes, a plurality of transfer transistors, one shared floating diffusion (floating diffusion region), and other shared pixel transistors one for each type. That is, in the shared pixels, the photodiodes and the transfer transistors that constitute a plurality of unit pixels share one each of the other pixel transistors.

The control circuit 38 receives an input clock and data which designates an operation mode and the like, and also outputs data such as internal information of the solid-state imaging element 11. That is, the control circuit 38 generates a clock signal and a control signal which serve as a reference for operation of the vertical drive circuit 34, the column signal processing circuit 35, the horizontal drive circuit 36, and the like on the basis of a vertical synchronization signal, a horizontal synchronization signal, and a master clock. Then, the control circuit 38 outputs the generated clock signal and control signal to the vertical drive circuit 34, the column signal processing circuit 35, the horizontal drive circuit 36, and the like.

The vertical drive circuit 34 includes, for example, a shift register, selects a predetermined pixel drive wiring line 40, supplies a pulse for driving the pixels 32 to the selected pixel drive wiring line 40, and drives the pixels 32 in units of rows. That is, the vertical drive circuit 34 sequentially selects and scans each pixel 32 in the pixel array unit 33 in the vertical direction in units of rows and supplies a pixel signal based on signal charges generated according to the received light amount by a photoelectric conversion unit of each pixel 32 to the column signal processing circuit 35 through a vertical signal line 41.

The column signal processing circuit 35 is arranged in every column of the pixels 32 and performs signal processing such as noise removal on the signals output from the pixels 32 of one column for each pixel column. For example, the column signal processing circuit 5 performs signal processing such as correlated double sampling (CDS) for removing pixel-specific fixed pattern noise and AD conversion.

The horizontal drive circuit 36 includes, for example, a shift register, sequentially selects the column signal processing circuits 35 by sequentially outputting horizontal scanning pulses, and outputs the pixel signal from each of the column signal processing circuits 35 to a horizontal signal line 42.

The output circuit 37 performs signal processing on signals sequentially supplied from each of the column signal processing circuits 35 through the horizontal signal line 42 and outputs the processed signals. There is a case in which, for example, the output circuit 37 merely buffers, or a case in which the output circuit 37 performs black level adjustment, column variation correction, various types of digital signal processing, and the like. The input/output terminal 39 exchanges signals with the outside.

The solid-state imaging element 11 configured in the above-described manner is a so-called column AD type CMOS image sensor in which the column signal processing circuit 35 which performs the CDS processing and AD conversion processing is arranged in every pixel column.
(Circuit Configuration of Pixel)

Figure 5:
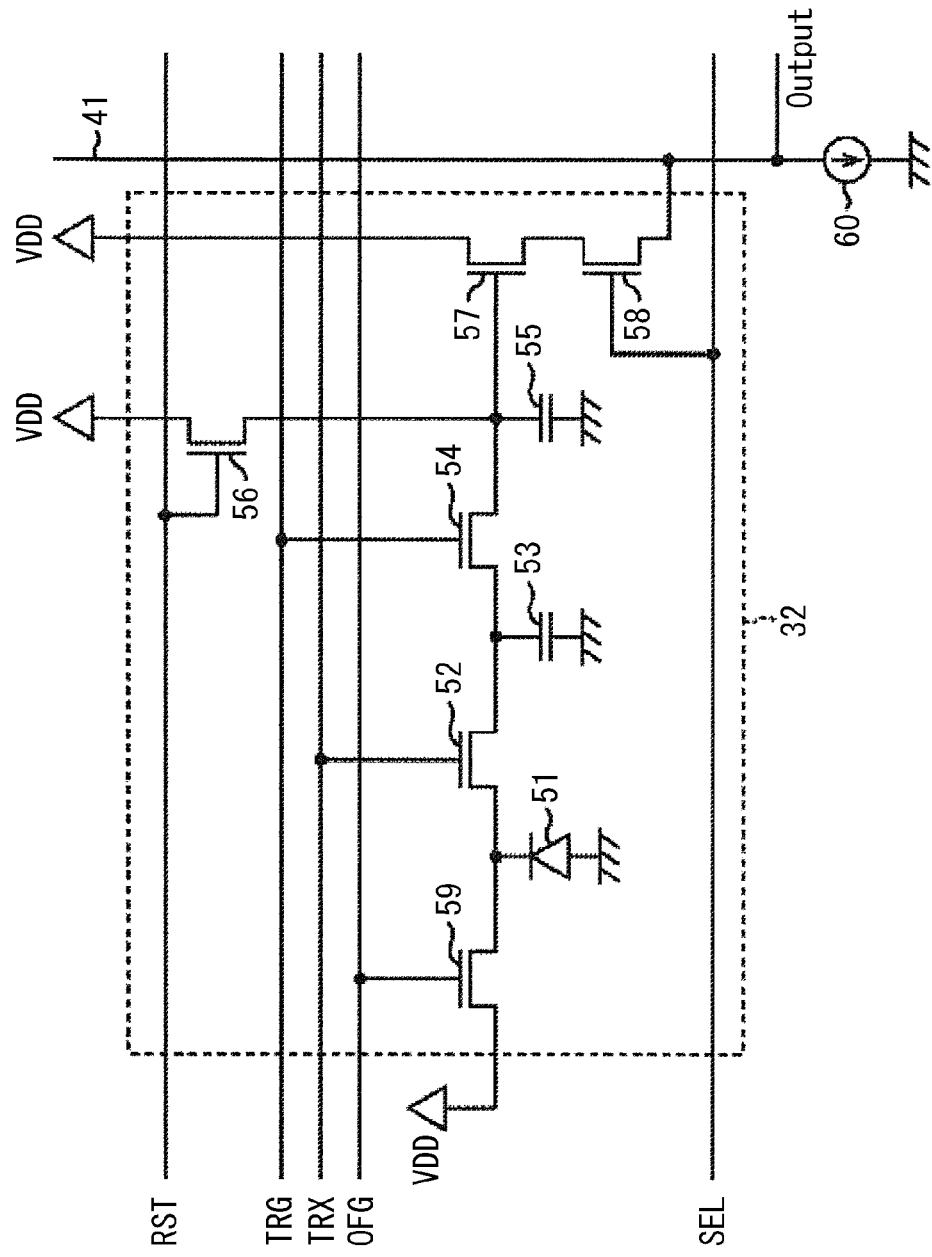
FIG. 5 is a view illustrating an example of an equivalent circuit of a pixel according to the first embodiment of the present disclosure.

FIG. 5 is a view illustrating an example of an equivalent circuit of the pixel 32 according to the first embodiment of the present disclosure. The pixel 32 illustrated in FIG. 5 illustrates a configuration that implements an electronic global shutter function. The pixel 32 includes a photodiode 51 as a photoelectric conversion element, a first transfer transistor 52, a memory unit (MEM) 53, a second transfer transistor 54, a floating diffusion region (FD) 55, a reset transistor 56, an amplifier transistor 57, a selection transistor 58, and a discharge transistor 59.

The photodiode 51 is a photoelectric conversion unit that generates and accumulates charges (signal charges) corresponding to the received light amount. An anode terminal of the photodiode 51 is grounded, and a cathode terminal thereof is connected to the memory unit 53 via the first transfer transistor 52. Furthermore, the cathode terminal of the photodiode 51 is also connected to the discharge transistor 59 for discharging unnecessary charges.

When turned on by a transfer signal TRX, the first transfer transistor 52 reads the charges generated by the photodiode 51 and transfers the charges to the memory unit 53. The memory unit 53 is a charge holding unit that temporarily holds charges until the charges are transferred to the FD 55. When turned on by a transfer signal TRG, the second transfer transistor 54 reads the charges held in the memory unit 53 and transfers the charges to the FD 55.

The FD 55 is a charge holding unit that holds the charges read from the memory unit 53 in order to read the charges as signals. When turned on by a reset signal RST, the reset transistor 56 resets the potential of the FD 55 by discharging the charges accumulated in the FD 55 to a constant voltage source VDD.

The amplifier transistor 57 outputs a pixel signal corresponding to the electric potential of the FD 55. That is, the amplifier transistor 57 constitutes a source follower circuit with a load MOS 60 as a constant current source, and a pixel signal indicating a level according to the charges accumulated in the FD 55 are output from the amplifier transistor 57 to the column signal processing circuit 35 (FIG. 4) via the selection transistor 58. The load MOS 60 is arranged, for example, in the column signal processing circuit 35.

The selection transistor 58 is turned on when the pixel 32 is selected by a selection signal SEL, and outputs a pixel signal of the pixel 32 to the column signal processing circuit 35 via the vertical signal line 41. When turned on by a discharge signal OFG, the discharge transistor 59 discharges unnecessary charges accumulated in the photodiode 51 to the constant voltage source VDD. The transfer signals TRX and TRG, the reset signal RST, the discharge signal OFG, and the selection signal SEL are supplied from the vertical drive circuit 34 (FIG. 4) via the pixel drive wiring line 40 (FIG. 4).

Next, the operation of the pixel 32 will be briefly described. First, before exposure is started, the discharge transistor 59 is turned on by supplying the discharge signal OFG at the high level to the discharge transistor 59, the charges accumulated in the photodiode 51 are discharged to the constant voltage source VDD, and the photodiodes 51 of all the pixels are reset. After the photodiode 51 is reset, when the discharge transistor 59 is turned off by the discharge signal OFG at the low level, exposure is started in all the pixels of the pixel array unit 33.

When a predetermined exposure time has elapsed, the first transfer transistor 52 is turned on by the transfer signal TRX in all the pixels of the pixel array unit 33, and the charges accumulated in the photodiode 51 are transferred to the memory unit 53.

After the first transfer transistor 52 is turned off, the charges held in the memory unit 53 of each pixel 32 are sequentially read out to the column signal processing circuit 35 in units of rows. In the read operation, the second transfer transistor 54 of the pixel 32 of the read row is turned on by the transfer signal TRG, and the charges held in the memory unit 53 are transferred to the FD 55. Then, when the selection transistor 58 is turned on by the selection signal SEL, a signal indicating a level corresponding to the charges accumulated in the FD 55 are output from the amplifier transistor 57 to the column signal processing circuit 35 via the selection transistor 58.

As described above, in the pixel 32 having the pixel circuit in FIG. 5, the exposure time is set to be the same in all the pixels of the pixel array unit 33, and after the exposure is finished, the charges are temporarily held in the memory unit 53, and the global shutter system operation (imaging) of sequentially reading the charges from the memory unit 53 in units of rows is possible. Note that the circuit configuration of the pixel 32 is not limited to the configuration illustrated in FIG. 5, and for example, a circuit configuration that does not include the memory unit 53 and performs the operation by a so-called rolling shutter system can be adopted.

(Detailed Structure of Solid-State Imaging Element)

Figure 6:
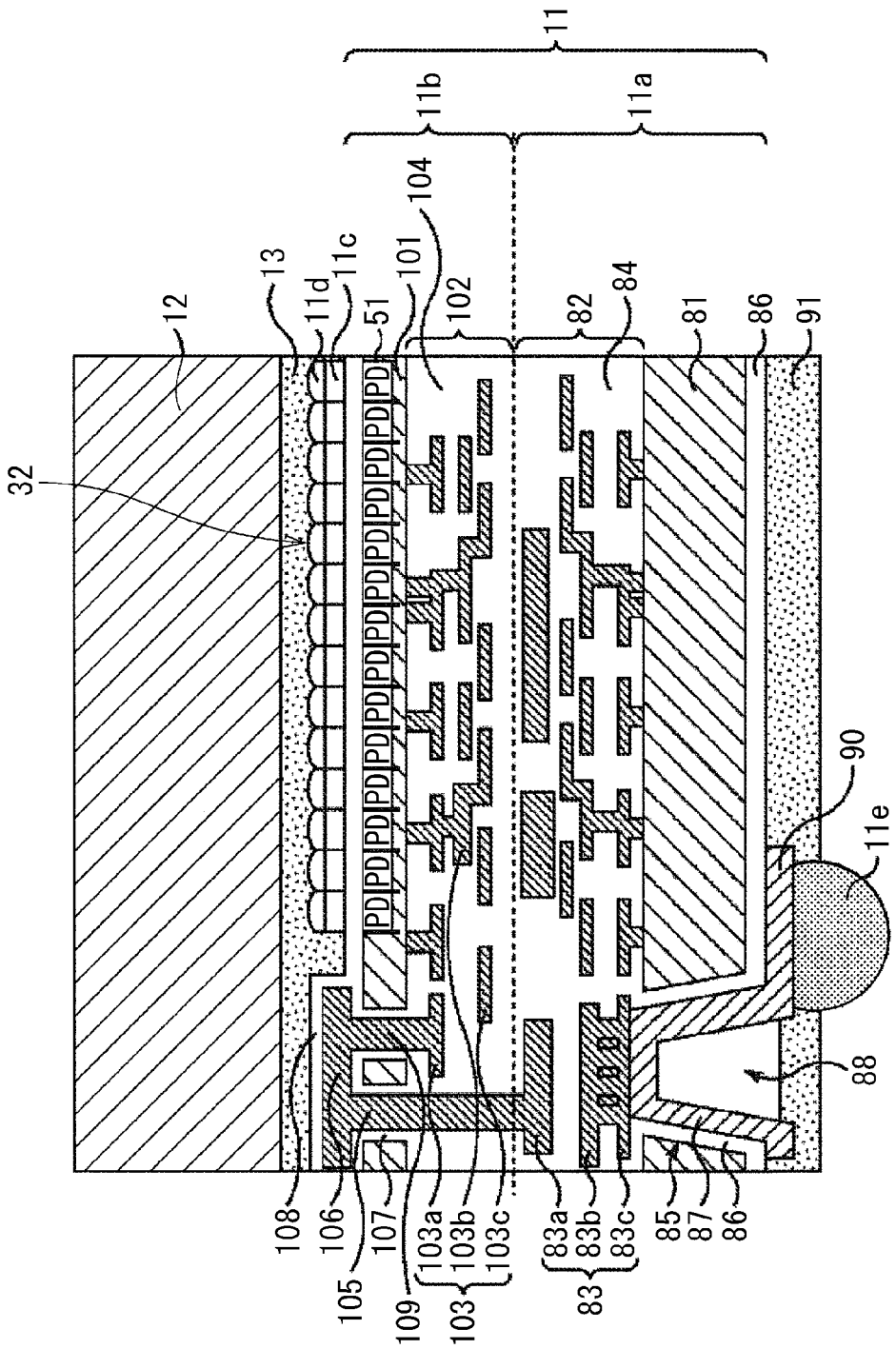
FIG. 6 is an enlarged cross-sectional view illustrating an example of a detailed structure of the solid-state imaging element according to the first embodiment of the present disclosure.

Next, an example of a detailed structure of the solid-state imaging element 11 will be described. FIG. 6 is an enlarged cross-sectional view illustrating an example of the detailed structure of the solid-state imaging element 11 according to the first embodiment of the present disclosure. In the logic substrate 11a, a multilayer wiring layer 82 is formed on the upper side (pixel sensor substrate 11b side) of a semiconductor substrate 81 (hereinafter, referred to as a silicon substrate 81) constituted by using, for example, silicon (Si). The multilayer wiring layer 82 constitutes the control circuit 22 and the logic circuit 23 illustrated in FIGS. 3A and 3B.

The multilayer wiring layer 82 includes a plurality of wiring layers 83 including an uppermost wiring layer 83a closest to the pixel sensor substrate 11b, an intermediate wiring layer 83b, a lowermost wiring layer 83c closest to the silicon substrate 81, and the like, and an interlayer insulating film 84 formed between the wiring layers 83.

The wiring layer 83 is formed using, for example, copper (Cu), aluminum (Al), tungsten (W), or the like. The interlayer insulating film 84 is formed using, for example, a silicon oxide film, a silicon nitride film, or the like. In each of the plurality of wiring layers 83 and the interlayer insulating film 84, all the layers may include the same material, or two or more materials may be used depending on the layer.

A silicon through hole 85 penetrating the silicon substrate 81 is formed at a predetermined position of the silicon substrate 81. A connection conductor 87 is embedded in the inner wall of the silicon through hole 85 with an insulating film 86 interposed therebetween to form a through silicon via (TSV) 88. The insulating film 86 may be formed using, for example, an $SiO_2$ film, a SiN film, and the like.

Note that, in the through silicon via 88 illustrated in FIG. 6, the insulating film 86 and the connection conductor 87 are formed along the inner wall surface, and the inside of the silicon through hole 85 is hollow. However, depending on the inner diameter, the entire of the inside of the silicon through hole 85 may be filled with the connection conductor 87. In other words, the inside of the through hole may be filled with a conductor, or a part of the through hole may be a cavity. This applies similarly to a through chip via (TCV) 105 and the like described later.

The connection conductor 87 of the through silicon via 88 is connected to the rewiring line 90 formed on the lower surface side of the silicon substrate 81. The rewiring line 90 is connected to the solder ball 11e. The connection conductor 87 and the rewiring line 90 can be formed using, for example, copper (Cu), tungsten (W), tungsten (W), polysilicon, or the like.

Furthermore, on the lower surface side of the silicon substrate 81, a solder mask (solder resist) 91 is formed so as to cover the rewiring line 90 and the insulating film 86 except for the region where the solder ball 11e is formed.

On the other hand, in the pixel sensor substrate 11b, a multilayer wiring layer 102 is formed on the lower side (logic substrate 11a side) of the semiconductor substrate 101 (hereinafter, referred to as a silicon substrate 101) constituted by using, for example, silicon (Si). The multilayer wiring layer 102 constitutes a pixel circuit of the pixel region 21 illustrated in FIGS. 3A and 3B.

The multilayer wiring layer 102 includes a plurality of wiring layers 103 including an uppermost wiring layer 103a closest to the silicon substrate 101, an intermediate wiring layer 103b, a lowermost wiring layer 103c closest to the logic substrate 11a, and the like, and an interlayer insulating film 104 formed between the wiring layers 103.

As the material used as the plurality of wiring layers 103 and the interlayer insulating film 104, the same type of material as the material of the wiring layer 83 and the interlayer insulating film 84 described above can be adopted. Furthermore, the plurality of wiring layers 103 and the interlayer insulating film 104 may be formed by using one or two or more materials, which is similar to the wiring layer 83 and the interlayer insulating film 84 described above.

Note that, in the example of FIG. 6, the multilayer wiring layer 102 of the pixel sensor substrate 11b includes the three wiring layers 103, and the multilayer wiring layer 82 of the logic substrate 11a includes the four wiring layers 83. However, the total number of wiring layers is not limited thereto, and any number of wiring layers can be formed.

In the silicon substrate 101, the photodiode 51 formed by a PN junction is formed for every pixel 32. Furthermore, although not illustrated, a plurality of pixel transistors such as the first transfer transistor 52 and the second transfer transistor 54, a memory unit (MEM) 53, and the like are also formed in the multilayer wiring layer 102 and the silicon substrate 101.

At a predetermined position of the silicon substrate 101 where the color filters 11c and the on-chip lenses 11d are not formed, a through silicon via 109 connected to the wiring layer 103a of the pixel sensor substrate 11b and the through chip via 105 connected to the wiring layer 83a of the logic substrate 11a are formed.

The through chip via 105 and the through silicon via 109 are connected by a connection wiring line 106 formed on the upper surface of the silicon substrate 101. Furthermore, an insulating film 107 is formed between each of the through silicon via 109 and the through chip via 105 and the silicon substrate 101. Moreover, on the upper surface of the silicon substrate 101, the color filters 11c and the on-chip lenses 11d are formed with a planarization film (insulating film) 108 interposed therebetween.

As described above, the solid-state imaging element 11 illustrated in FIG. 2 has a laminated structure in which the multilayer wiring layer 102 side of the logic substrate 11a and the multilayer wiring layer 82 side of the pixel sensor substrate 11b are bonded together. In FIG. 6, a bonding surface between the multilayer wiring layer 82 side of the logic substrate 11a and the multilayer wiring layer 102 side of the pixel sensor substrate 11b is indicated by a broken line.

Furthermore, in the solid-state imaging element 11 of the imaging device 1, the wiring layer 103 of the pixel sensor substrate 11b is connected to the wiring layer 83 of the logic substrate 11a by two through vias, which are the through silicon via 109 and the through chip via 105, and the wiring layer 83 of the logic substrate 11a is connected to the solder ball (back electrode) 11e by the through silicon via 88 and the rewiring line 90. With this arrangement, the plane area of the imaging device 1 can be minimized to the utmost. Moreover, the structure can also be lowered in the height direction by forming a space between the solid-state imaging element 11 and the glass substrate 12 into a cavity-less structure and bonding the two with the adhesive 13.

Therefore, according to the imaging device 1 illustrated in FIG. 1, a semiconductor device (semiconductor package) that is further downsized can be achieved. With the configuration of the imaging device 1 as described above, because the IRCF 14 is provided on the solid-state imaging element 11 and the glass substrate 12, occurrence of flare and ghost due to internal irregular reflection of light can be suppressed.

(Pixel Sensor Substrate)

Figure 7:
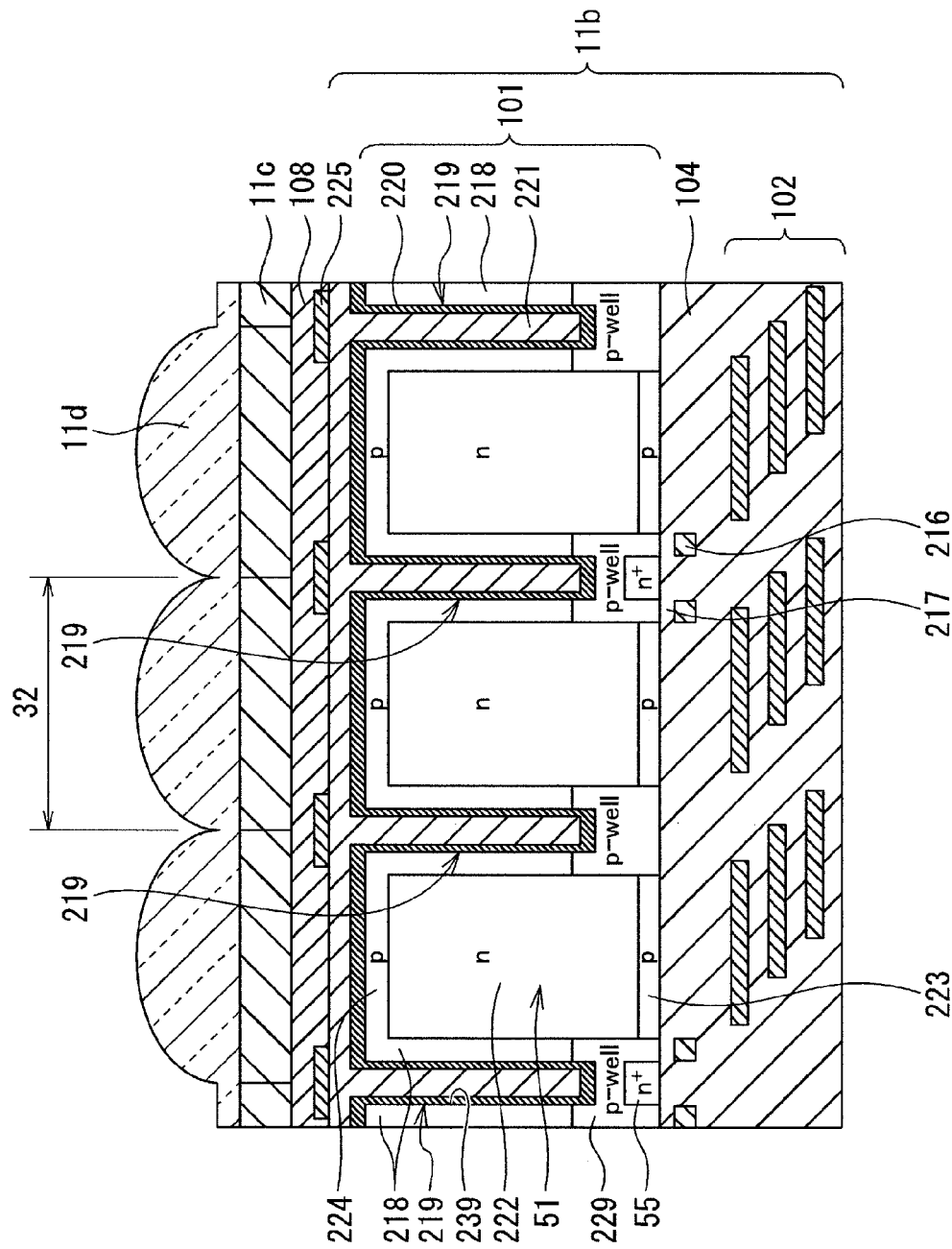
FIG. 7 is a cross-sectional view illustrating a configuration example of a pixel sensor substrate according to the first embodiment of the present disclosure.

Next, the pixel sensor substrate 11b according to the first embodiment of the present disclosure will be described in more detail. FIG. 7 is a cross-sectional view illustrating a configuration example of the pixel sensor substrate 11b according to the first embodiment of the present disclosure.

As illustrated in FIG. 7, the pixel sensor substrate 11b of the present embodiment further includes the silicon substrate 101 having a plurality of pixels, the multilayer wiring layer 102 formed on the front surface side of the silicon substrate 101, an insulating film (hereinafter, a fixed charge film) 220 having a fixed charge sequentially formed on the back surface side of the silicon substrate 101, an insulating film 221 (an example of a "filling film" of the present disclosure), a light shielding film 225, the planarization film 108, the color filters 11c, and on-chip lenses 11d.

The silicon substrate 101 has a thickness of, for example, 1 μm or more and 6 μm or less. In the pixel region 21 of the silicon substrate 101, a plurality of pixels each including the photodiode 51 and the plurality of pixel transistors is formed in a two-dimensional matrix. Further, the adjacent photodiodes 51 are electrically separated by an inter-pixel separation part 219.

The photodiode 51 includes p-type regions 223 and 224 formed on the front surface side and the back surface side of the silicon substrate 101, and an n-type region 222 formed therebetween. In the photodiode 51, a pn junction is formed between the p-type regions 223 and 224 and the n-type region 222. In the photodiode 51, signal charges corresponding to the amount of incident light are generated and accumulated in the n-type region 222. In addition, electrons that cause dark current generated at an interface of the semiconductor substrate 101 are absorbed by holes that are majority carriers of the p-type regions 223 and 224 formed on the front surface and the back surface of the silicon substrate 101, which causes the dark current to be suppressed. Furthermore, the photodiodes 51 are electrically separated from each other by p-type regions 218 and the inter-pixel separation part 219 formed in the p-type region 218.

As illustrated in FIG. 7, the FD 55 includes an n+-type region formed by ion-implanting n-type impurities at a high concentration into a p-well layer 229 formed on the front surface side of the silicon substrate 101. Furthermore, a transfer gate electrode 216, which is a gate electrode of a transfer transistor (for example, the first transfer transistor 52 or the second transfer transistor 54 illustrated in FIG. 5), is formed on the front surface side of the silicon substrate 101 between the photodiode 51 and the FD 55 with a gate insulating film 217 interposed therebetween.

The inter-pixel separation part 219 has a trench isolation structure. For example, the inter-pixel separation part 219 includes a trench 239 formed in the depth direction from the back surface side of the silicon substrate 101, the fixed charge film 220 formed so as to cover the inner side surface in the trench 239, and the insulating film 221 (an example of a "filling film" of the present disclosure) embedded in the trench 239 with the fixed charge film 220 interposed therebetween. The inter-pixel separation part 219 is formed by being dug into the p-type region 218 formed in the silicon substrate 101. The inter-pixel separation part 219 is formed in, for example, a lattice shape so as to surround the pixel. Furthermore, in a case where a pixel transistor is formed between the adjacent photodiode 51 and photodiode 51, the inter-pixel separation part 219 is arranged so as to overlap the FD 55 and a source/drain region of the pixel transistor in plan view.

Furthermore, the inter-pixel separation part 219 is formed at a depth reaching the p-well layer 29 in which the pixel transistor is formed, and is formed at a depth not reaching the FD 55 or the source/drain region. That is, the inter-pixel separation part 219 is formed from the back surface (in FIG. 7, the upper surface) of the silicon substrate 101 to a middle position in the thickness direction of the silicon substrate 101.

The trench 239 constituting the inter-pixel separation part 219 is open to the back surface side of the silicon substrate 101 and has a bottom surface in the silicon substrate 101. The trench 239 is formed at a depth not reaching the front surface of the silicon substrate 101. For example, in a case where the silicon substrate 101 has a thickness of 1 μm or more and 6 μm or less, the trench 239 is formed at a depth of 0.25 μm or more and 5.0 μm or less from the back surface of the silicon substrate 101.

Note that FIG. 7 illustrates a case where the inter-pixel separation part 219 is formed to have a depth reaching the p-well layer 229, but the inter-pixel separation part 219 may not necessarily have a depth reaching the p-well layer 229. For example, the inter-pixel separation part 219 may not reach the p-well layer 229 and may be formed to remain in the p-type region 218. Even in a configuration in which the inter-pixel separation part 219 does not reach the p-well layer 229, the effect of insulation separation can be obtained.

In addition, the fixed charge film 220 formed in the trench 239 is formed on the inner peripheral surface and the bottom surface of the trench 239, and is formed on the entire back surface of the silicon substrate 101. Note that, in the following description, the inner peripheral surface and the bottom surface of the trench 239 are collectively referred to as an "inner wall surface". As the fixed charge film 220, it is preferable to use a material that can enhance pinning by generating fixed charges by being deposited on a substrate such as silicon, and a high refractive index material film or a high dielectric film having negative charges can be used.

As a specific material of the fixed charge film 220, for example, an oxide or nitride containing at least any one of elements including hafnium (Hf), aluminum (Al), zirconium (Zr), tantalum (Ta), or titanium (Ti), can be applied. Examples of a film forming method of the fixed charge film 220 include a chemical vapor deposition (CVD) method, a sputtering method, an atomic layer deposition (ALD) method, and the like. Note that, if the ALD method is used, a silicon oxide ($SiO_2$) film that reduces the interface state can be formed to have a film thickness of about 1 nm at the same time as the film formation. Furthermore, the material for the fixed charge film 220 apart from ones described above includes an oxide, nitride, or the like containing at least one element including lanthanum (La), praseodymium (Pr), cerium (Ce), neodymium (Nd), promethium (Pm), samarium (Sm), europium (Eu), gadolinium (Gd), terbium (Tb), dysprosium (Dy), holmium (Ho), thulium (Tm), ytterbium (Yb), lutetium (Lu), or yttrium (Y). Moreover, the fixed charge film described above can be formed using a hafnium oxynitride film or an aluminum oxynitride film.

As the material of the fixed charge film 220, silicon (Si) or nitrogen (N) may be added to the film as long as insulation properties are not impaired. The concentration thereof is appropriately determined within a range in which the insulation properties of the film are not impaired. As described above, the addition of silicon (Si) or nitrogen (N) makes it possible to increase the heat resistance of the film and the ability to prevent ion implantation in the process.

In the present embodiment, because the fixed charge film 220 having negative charges are formed on the inner wall surface of the trench 239 and the back surface of the silicon substrate 101, an inversion layer is formed on a surface in contact with the fixed charge film 220. Therefore, a silicon interface is pinned by the inversion layer, and thus the generation of dark current is suppressed. Furthermore, in a case where the trench 239 is formed in the silicon substrate 101, there is a possibility that physical damage occurs on the side wall and the bottom surface of the trench 239 and pinning detachment occurs in a peripheral part of the trench 239. With respect to this problem, in the present embodiment, by forming the fixed charge film 220 having a large amount of fixed charges on the side wall and the bottom surface of the trench 239, pinning detachment is prevented.

The insulating film 221 is embedded in the trench 239 in which the fixed charge film 220 is formed, and is formed on the entire back surface side of the silicon substrate 101. The material of the insulating film 221 is preferably a material having a refractive index different from that of the fixed charge film 220, and for example, silicon oxide, silicon nitride, silicon oxynitride, resin, or the like can be used. Furthermore, a material having a characteristic of not having positive fixed charges or having a small amount of positive fixed charges can be used for the insulating film 221.

Then, by embedding the trench 239 in the insulating film 221, the photodiodes 51 each constituting the pixel are separated from each other with the insulating film 221 interposed therebetween. With this arrangement, the signal charges are less likely to leak to the adjacent pixel, and thus, in a case where the signal charges exceeding a saturated charge amount (Qs) are generated, the overflowed signal charges can be suppressed from flowing into the adjacent photodiode 51. Therefore, the electronic color mixing can be suppressed.

In addition, the two-layer structure of the fixed charge film 220 and the insulating film 221 formed on the back surface side which is the incident surface side of the silicon substrate 101 has a role of an antireflection film by a difference in refractive index. Therefore, light incident from the back surface side of the silicon substrate 101 can be prevented from being reflected on the back surface side of the silicon substrate 101.

The light shielding film 225 is formed in a predetermined region on the insulating film 221 formed on the back surface of the silicon substrate 101, and is formed into a lattice shape so as to form an opening for the photodiode 51 in a pixel region. That is, the light shielding film 225 is formed at a position corresponding to the inter-pixel separation part 219. The light shielding film 225 is formed at a position overlapping the inter-pixel separation part 219 in plan view. A material that shields light may be used as the material constituting the light shielding film 225, and for example, aluminum (Al), tungsten (W), or copper (Cu) can be used.

The planarization film 108 is formed on the entire surface of the insulating film 221 including the light shielding film 225, which planarizes the surface on the back surface side of the silicon substrate 101. As the material of the planarization film 108, for example, an organic material such as resin can be used.

The color filters 11c are formed on the upper surface of the planarization film 108, and are formed corresponding to, for example, red (R), green (G), and blue (B) for each pixel. Light of a desired wavelength is transmitted through the color filter 11c and the transmitted light is incident on the photodiode 51 formed in the silicon substrate 101.

The on-chip lens 11d is formed on the color filter 11c. The irradiated light is condensed by the on-chip lens 11d and the condensed light is efficiently incident on each photodiode 51 through the color filter 11c.

In the pixel sensor substrate 11b having the above configuration, light is emitted from the back surface (in FIG. 7, the upper surface) side of the silicon substrate 101, and the light transmitted through the on-chip lens 11d and the color filter 11c is photoelectrically converted by the photodiode 51, which generates signal charges. Then, the signal charges generated by the photodiode 51 is output as a pixel signal by the vertical signal line 41 (see, for example, FIG. 4) configured by a part of the multilayer wiring layer 102 via the pixel transistor formed on the front surface side of the silicon substrate 101.

(Pixel Layout)

Next, a layout (hereinafter, a pixel layout) of the pixel array unit 33 of the solid-state imaging element 11 will be described. In the embodiment of the present disclosure, the pixel layout can adopt, for example, one or more configurations of the following configuration examples 1 to 3.

(1) Configuration Example 1

Figure 8A:
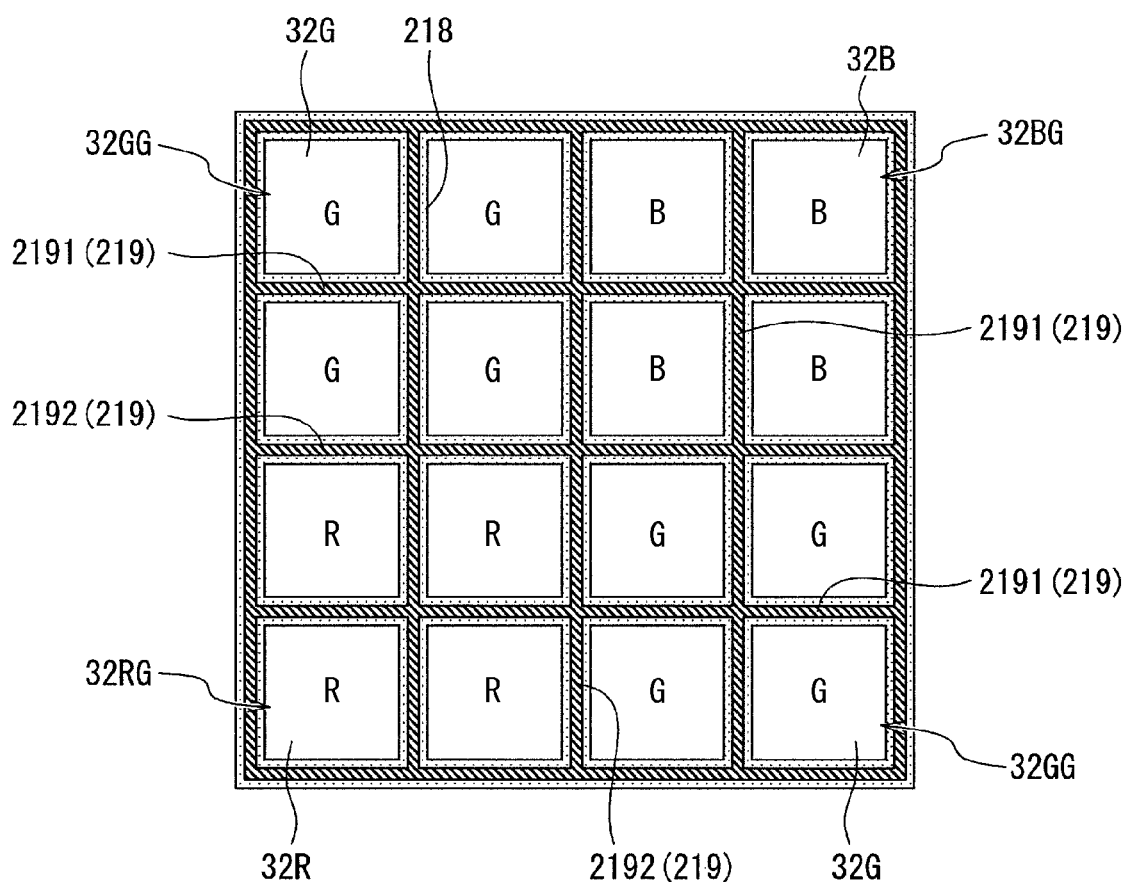
FIG. 8A is a plan view illustrating a configuration example 1 of a pixel layout according to the first embodiment of the present disclosure.
Figure 8B:
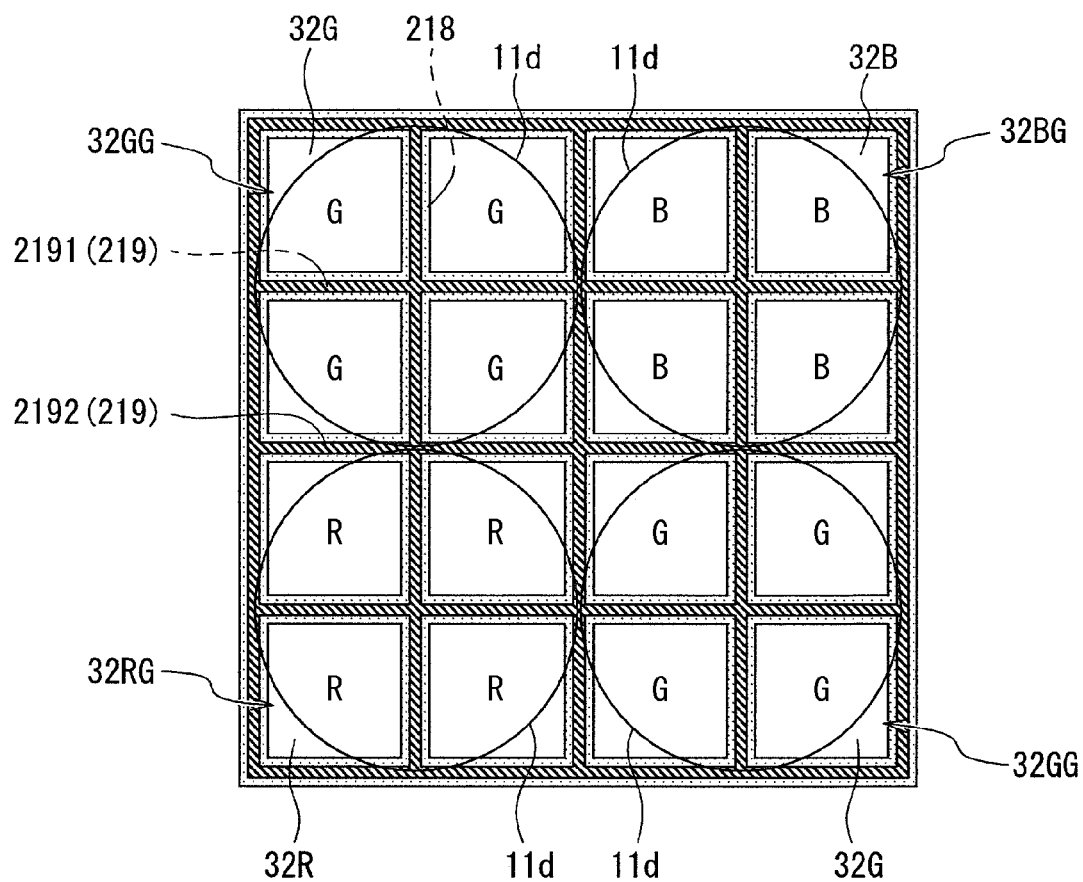
FIG. 8B is a plan view illustrating an arrangement example of on-chip lenses with respect to the pixel layout illustrated in FIG. 8A.

FIG. 8A is a plan view illustrating a configuration example 1 of the pixel layout according to the first embodiment of the present disclosure. FIG. 8B is a plan view illustrating an arrangement example of the on-chip lenses 11d with respect to the pixel layout illustrated in FIG. 8A. Note that, in FIGS. 8A and 8B, the pixel 32 denoted by the reference sign G is a green pixel 32G (an example of a "first color pixel" of the present disclosure) covered with a G filter (an example of a "first color filter" of the present disclosure) that transmits green light (an example of a "first color" of the present disclosure) among the color filters 11c (see, for example, FIG. 7). The pixel 32 denoted by the reference sign R is a red pixel 32R (an example of a "second color pixel" of the present disclosure) covered with a R filter (an example of a "second color filter" of the present disclosure) that transmits red light (an example of a "second color" of the present disclosure) among the color filters 11c. The pixel 32 denoted by the reference sign B is a blue pixel 32B (an example of a "third color pixel" of the present disclosure) covered with a B filter (an example of a "third color filter" of the present disclosure) that transmits blue light (an example of a "third color" of the present disclosure) among the color filters 11c.

As illustrated in FIG. 8A, the solid-state imaging element 11 includes, for example, a green pixel group 32GG (an example of a "first color pixel group" of the present disclosure), a red pixel group 32RG (an example of a "21st color pixel group" of the present disclosure), and a blue pixel group 32BG (an example of a "21st color pixel group" of the present disclosure). The green pixel group 32GG includes four pixels in which green pixels 32G are aligned two by two in a horizontal direction (an example of a "first direction" of the present disclosure) and a vertical direction (an example of a "second direction" of the present disclosure) in plan view. The red pixel group 32RG includes four pixels in which red pixels 32R are aligned two by two in the horizontal direction and the vertical direction in plan view. The blue pixel group 32BG includes four pixels in which blue pixels 32B are aligned two by two in the horizontal direction and the vertical direction in plan view.

The green pixel group 32GG, the red pixel group 32RG, and the blue pixel group 32BG constitute a unit layout. For example, a pair of the green pixel groups 32GG is arranged on a first diagonal line, and the red pixel group 32RG and the blue pixel group 32BG are arranged on a second diagonal line intersecting (for example, orthogonal to) the first diagonal line to configure the unit layout. The pixel layout of the solid-state imaging element 11 has a configuration in which the unit layout is repeatedly arranged in the horizontal direction and the vertical direction in plan view. With this arrangement, in the green pixel group 32GG, the red pixel group 32RG, and the blue pixel group 32BG, pixel groups of different colors are adjacent to each other in the horizontal direction and the vertical direction in plan view.

As illustrated in FIG. 8B, the on-chip lenses 11d are arranged one by one for every four pixels arranged by two pixels in each of the horizontal direction and the vertical direction in plan view. For example, one on-chip lens 11d is arranged in one green pixel group 32GG. One on-chip lens 11d is arranged in one red pixel group 32RG. One on-chip lens 11d is arranged in one blue pixel group 32BG.

As illustrated in FIGS. 8A and 8B, in the configuration example 1 of the pixel layout, pixels of the same color and pixels of different colors are respectively separated by the inter-pixel separation part 219 (see, for example, FIG. 7) having the trench isolation structure. For example, the inter-pixel separation part 219 includes a same-color pixel separation part 2191 for separating the adjacent pixels 32 of the same color and a different-color pixel separation part 2192 for separating the adjacent pixels 32 of different colors. One green pixel 32G and the other green pixel 32G adjacent to each other, one red pixel 32R and the other red pixel 32R adjacent to each other, and one blue pixel 32B and the other blue pixel 32B adjacent to each other are respectively separated by the same-color pixel separation part 2191. Furthermore, the green pixel 32G and the red pixel 32R adjacent to each other and the green pixel 32G and the blue pixel 32B adjacent to each other are respectively separated from each other by the different-color pixel separation part 2192. Note that being adjacent means being adjacent in the horizontal direction or the vertical direction in plan view.

In the configuration example 1 of the pixel layout shown in FIGS. 8A and 8B, the same-color pixel separation part 2191 and the different-color pixel separation part 2192 each have the trench isolation structure (for example, the structure of the inter-pixel separation part 219 in FIG. 7 or the structure of the inter-pixel separation part 219A illustrated in FIG. 24 to be described later). With this arrangement, the configuration example 1 of the pixel layout illustrated in FIGS. 8A and 8B can suppress color mixing between the same color pixels and color mixing between different color pixels.

(2) Configuration Example 2

In the first embodiment of the present disclosure, in the pixel layout, the pixels of different colors may be separated by the inter-pixel separation part having the trench isolation structure, and the pixels of the same color may be separated by a diffusion layer.

Figure 9A:
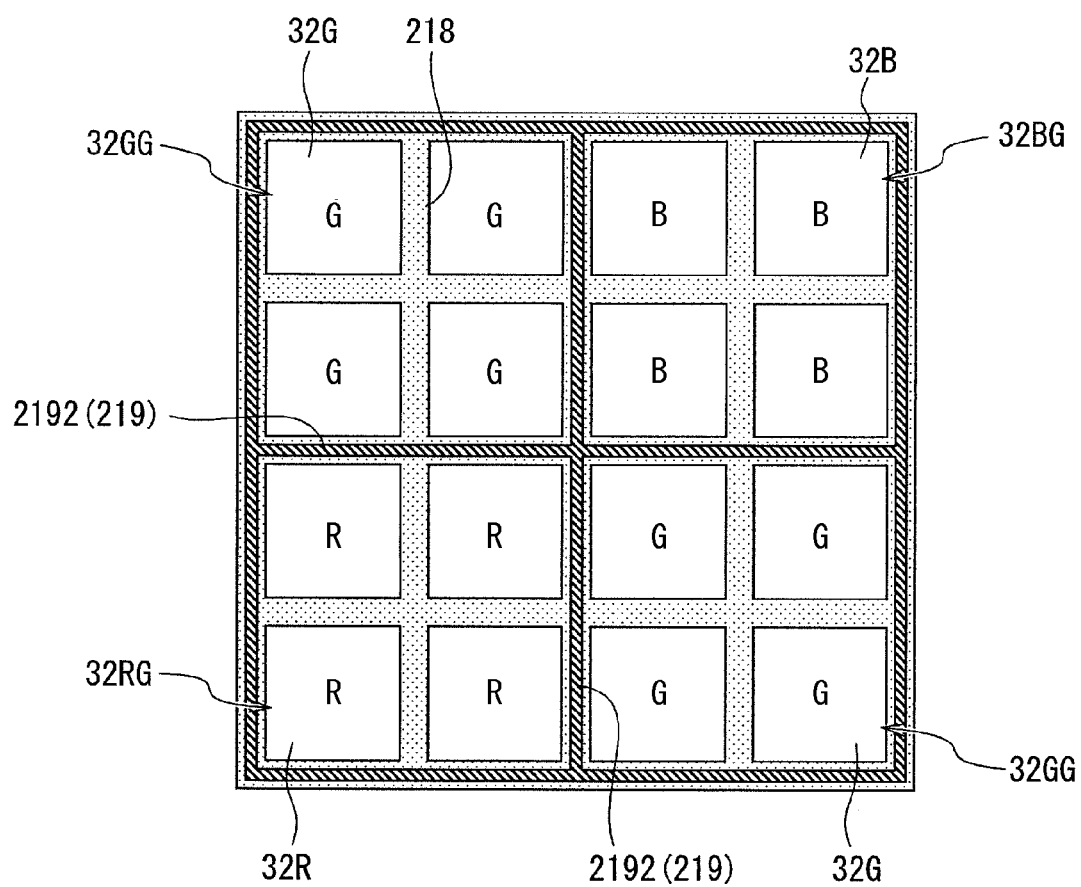
FIG. 9A is a plan view illustrating a configuration example 2 of the pixel layout according to the first embodiment of the present disclosure.
Figure 9B:
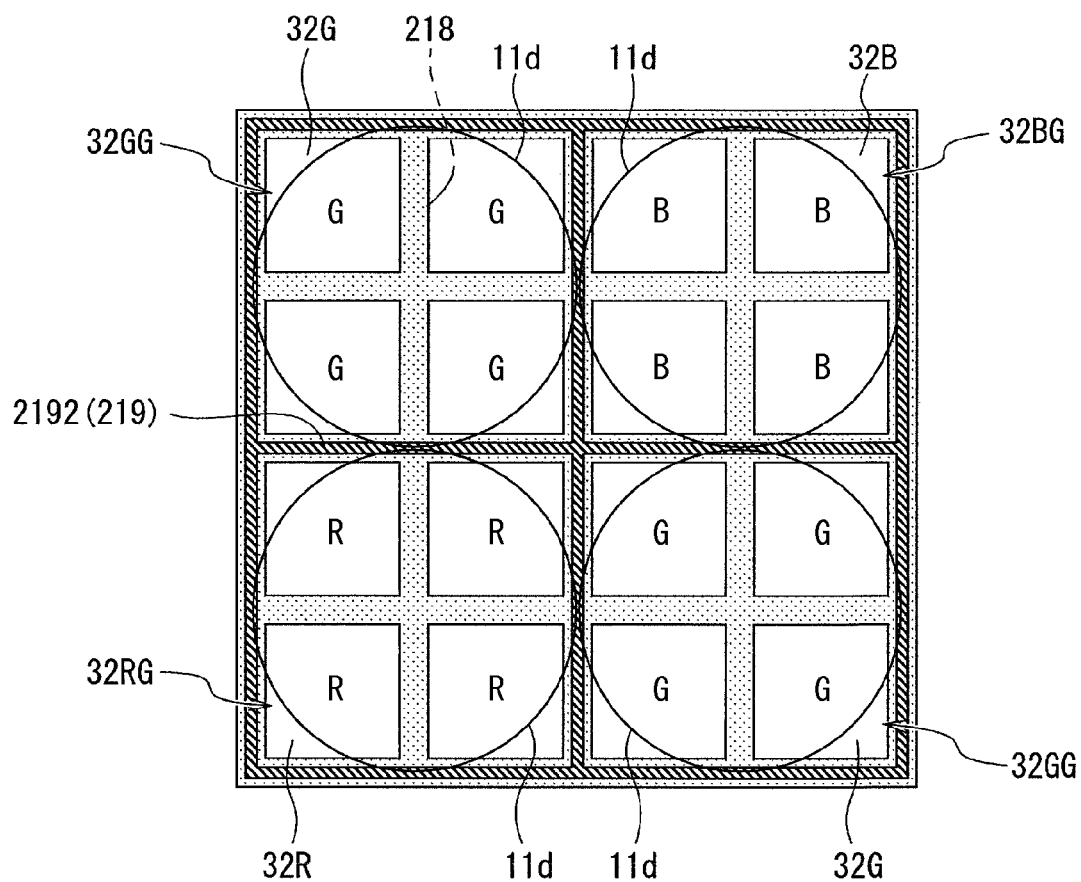
FIG. 9B is a plan view illustrating an arrangement example of the on-chip lenses with respect to the pixel layout illustrated in FIG. 9A.

FIG. 9A is a plan view illustrating a configuration example 2 of the pixel layout according to the first embodiment of the present disclosure. FIG. 9B is a plan view illustrating an arrangement example of the on-chip lenses with respect to the pixel layout illustrated in FIG. 9A. As illustrated in FIGS. 9A and 9B, in the configuration example 2 of the pixel layout, the different-color pixel separation part 2192 has the trench isolation structure. The same-color pixel separation part 2191 is not configured by the trench isolation structure but is configured only by the p-type region 218 as an example of the diffusion layer.

For example, the green pixel 32G and the red pixel 32R adjacent to each other and the green pixel 32G and the blue pixel 32B adjacent to each other are respectively separated from each other by the different-color pixel separation part 2192 having the trench isolation structure. One green pixel 32G and the other green pixel 32G adjacent to each other, one red pixel 32R and the other red pixel 32R adjacent to each other, and one blue pixel 32B and the other blue pixel 32B adjacent to each other are respectively separated by the same-color pixel separation part 2191 only including the p-type region 218.

In the configuration example 2 of the pixel layout illustrated in FIGS. 9A and 9B, because the different-color pixel separation part 2192 has the trench isolation structure, the color mixing between the different color pixels can be particularly suppressed.

(3) Configuration Example 3

Figure 10A:
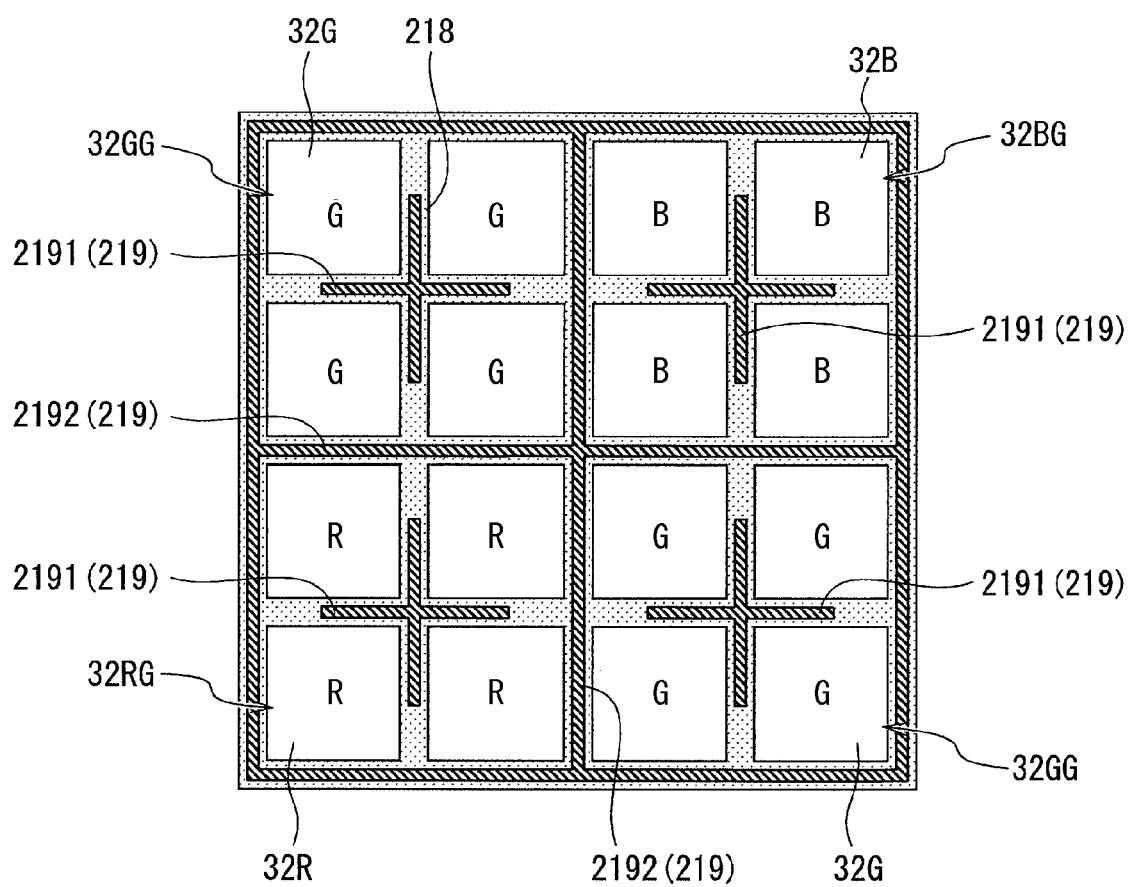
FIG. 10A is a plan view illustrating a configuration example 3 of the pixel layout according to the first embodiment of the present disclosure.
Figure 10B:
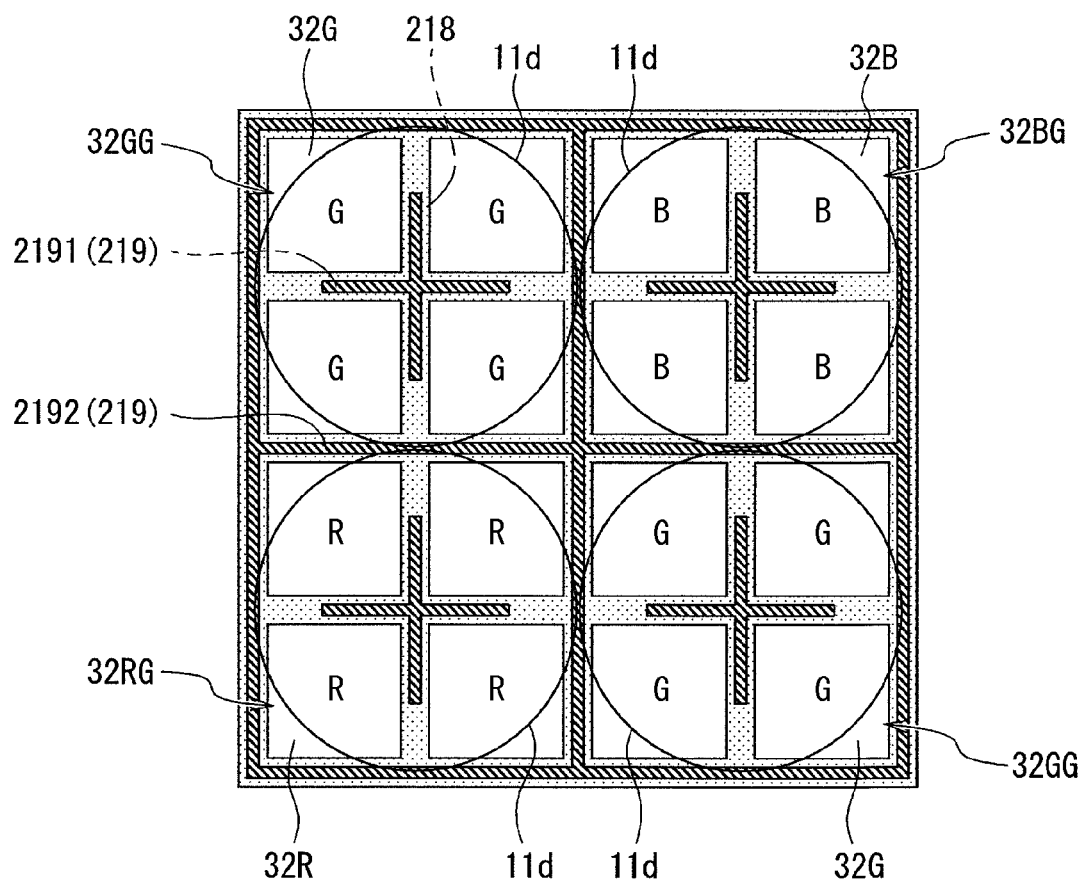
FIG. 10B is a plan view illustrating an arrangement example of the on-chip lenses with respect to the pixel layout illustrated in FIG. 10A.

In the embodiment of the present disclosure, the same color pixels may be partially separated by an inter-pixel separation part having the trench isolation structure in plan view. FIG. 10A is a plan view illustrating a configuration example 3 of the pixel layout according to the first embodiment of the present disclosure. FIG. 10B is a plan view illustrating an arrangement example of the on-chip lenses 11d with respect to the pixel layout illustrated in FIG. 10A. As illustrated in FIGS. 10A and 10B, in the configuration example 3 of the pixel layout, the different-color pixel separation part 2192 has the trench isolation structure. The same-color pixel separation part 2191 includes a portion having the trench isolation structure and a portion configured only by the p-type region 218.

For example, as illustrated in FIGS. 10A and 10B, the same-color pixel separation part 2191 in each of the green pixel group 32GG, the red pixel group 32RG, and the blue pixel group 32BG has the trench isolation structure except for the outer peripheral part of each pixel group. The same-color pixel separation part 2191 in the outer peripheral part of each pixel group includes only the p-type region 218. With this arrangement, the shape of the portion having the trench isolation structure among the same-color pixel separation part 2191 in plan view is a cross shape.

In the configuration example 3 of the pixel layout illustrated in FIGS. 10A and 10B, because the different-color pixel separation part 2192 has the trench isolation structure, the color mixing between the different color pixels can be particularly suppressed. Furthermore, because a part of the same-color pixel separation part 2191 has the trench isolation structure, the color mixing between the same color pixels can also be suppressed.

Note that the configuration example 3 described above may be an aspect of the modified example 1 illustrated in FIG. 11 or an aspect of the modified example 2 illustrated in FIG. 12 described in the following.

Figure 11:
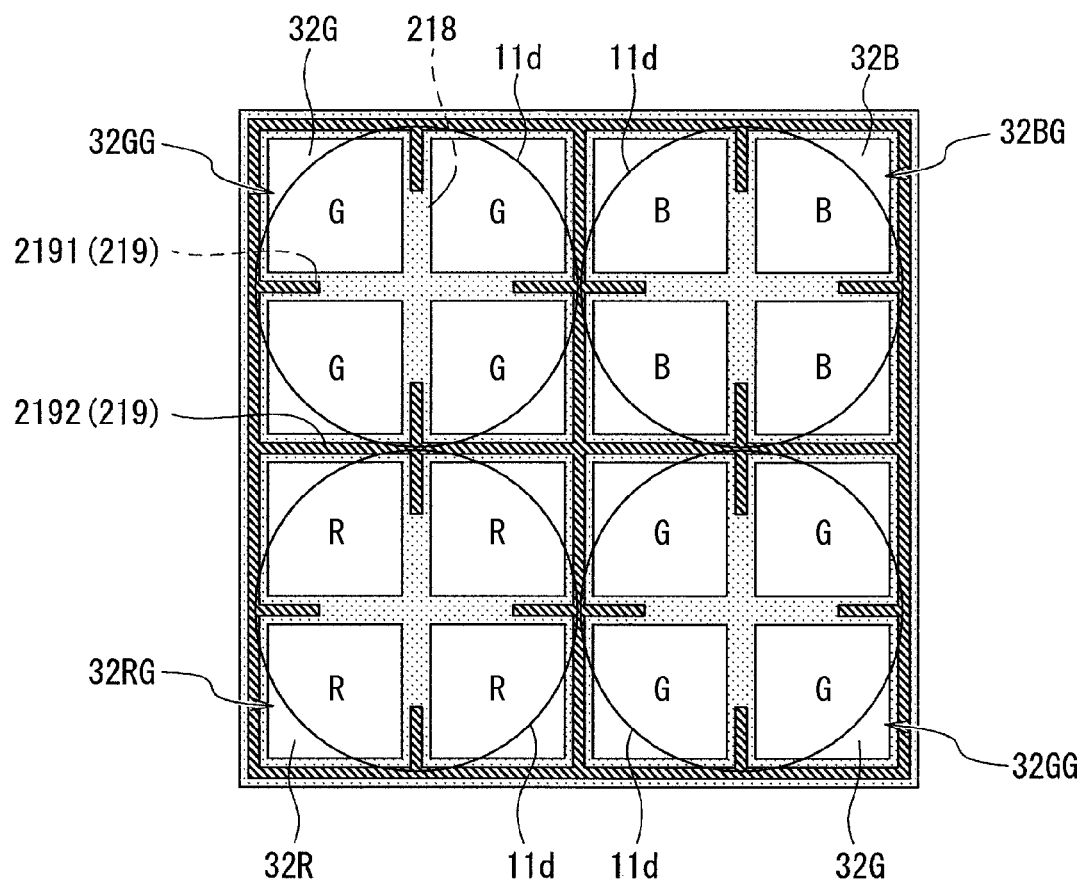
FIG. 11 is a plan view illustrating a modified example 1 of the configuration example 3 of the pixel layout.

FIG. 11 is a plan view illustrating the modified example 1 of the configuration example 3 of the pixel layout. For example, as illustrated in FIG. 11, the same color pixels in each of the green pixel group 32GG, the red pixel group 32RG, and the blue pixel group 32BG may be separated by the same-color pixel separation part 2191 having the trench isolation structure except for the central part of each pixel group. The same color pixels in the central part of each pixel group may be separated by the same-color pixel separation part 2191 that only includes the p-type region 218. With this arrangement, the shape of the same-color pixel separation part 2191 having the trench isolation structure in plan view is a linear shape protruding from the outer periphery of each pixel group toward the central part of each pixel group. Even in such an aspect, similarly to the configuration example 3 described above, the color mixing between different color pixels and the color mixing between the same color pixels can be suppressed.

Figure 12:
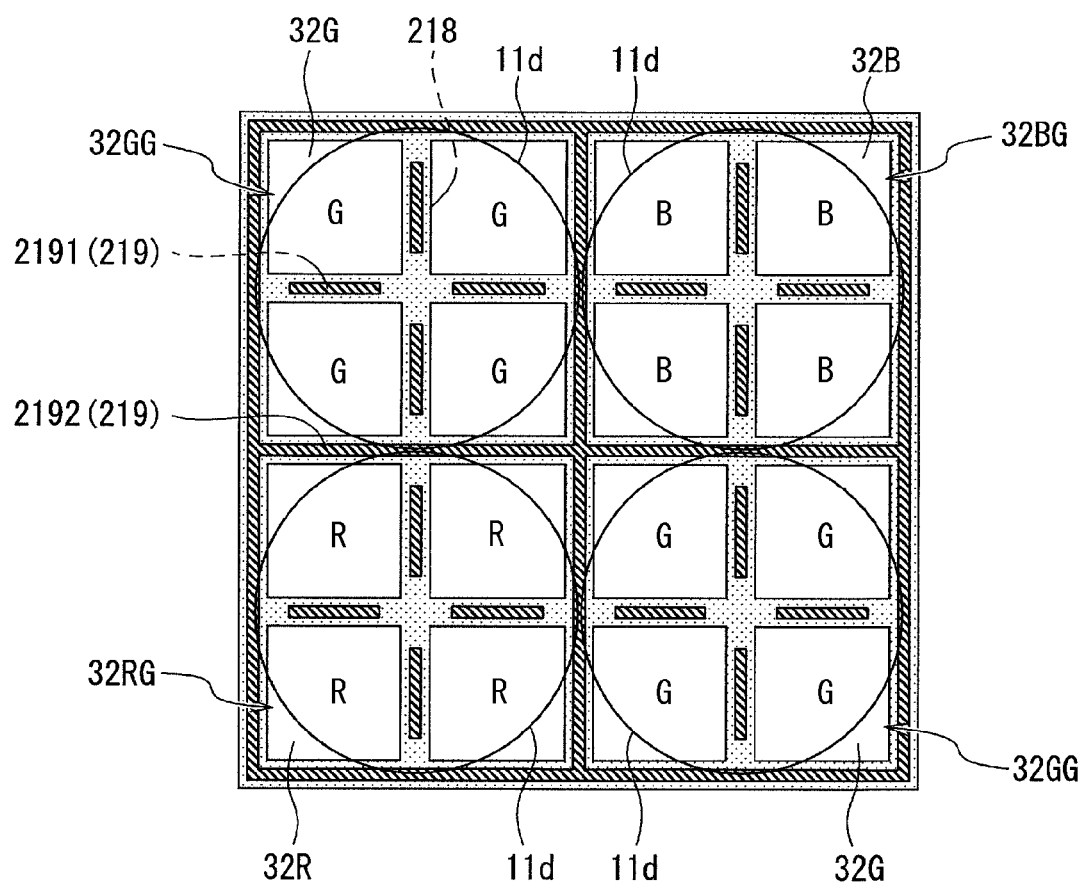
FIG. 12 is a plan view illustrating a modified example 2 of the configuration example 3 of the pixel layout.

FIG. 12 is a plan view illustrating the modified example 2 of the configuration example 3 of the pixel layout. For example, as illustrated in FIG. 12, the same color pixels in each of the green pixel group 32GG, the red pixel group 32RG, and the blue pixel group 32BG may be separated by the same-color pixel separation part 2191 having the trench isolation structure except for the outer peripheral part of each pixel group and in the very central part of each pixel group. The very central part of the pixel group means, for example, a region further close to the center of the central part of the pixel group described above. The same color pixels in the outer peripheral part of each pixel group and the same color pixels in the very central part of each pixel group may be separated by the same-color pixel separation part 2191 that only includes the p-type region 218. With this arrangement, the shape of the same-color pixel separation part 2191 having the trench isolation structure in plan view is a hollow cross shape. Even in such an aspect, similarly to the configuration example 3 described above, the color mixing between different color pixels and the color mixing between the same color pixels can be suppressed.

(4) Configuration Example 4

In the configuration examples 1 to 3 described above, an aspect in which one on-chip lens 11d is arranged in one pixel group including four pixels has been described. However, in the embodiment of the present disclosure, the arrangement of the on-chip lenses 11d with respect to the pixel layout is not limited thereto. In the embodiment of the present disclosure, one on-chip lens 11d may be arranged in one pixel 32. Furthermore, a diffusion layer may be provided in one pixel 32 in plan view.

Figure 13A:
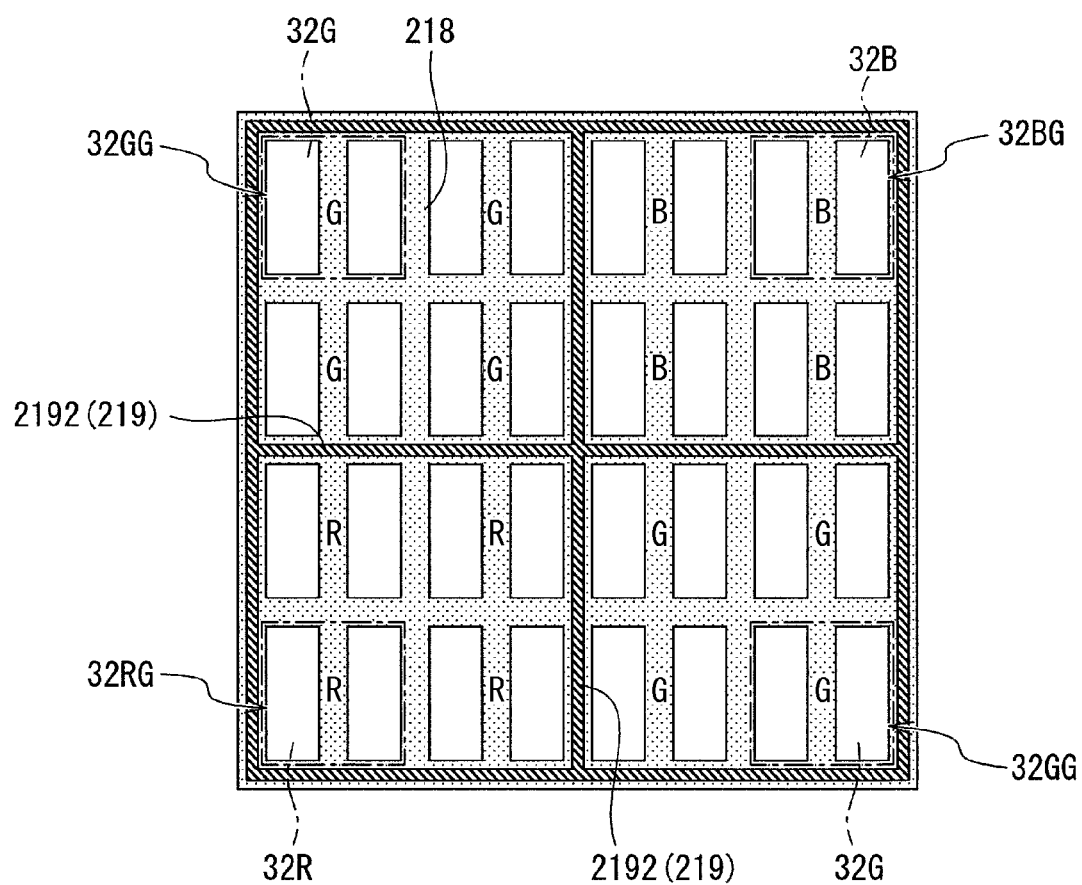
FIG. 13A is a plan view illustrating a configuration example 4 of the pixel layout according to the first embodiment of the present disclosure.
Figure 13B:
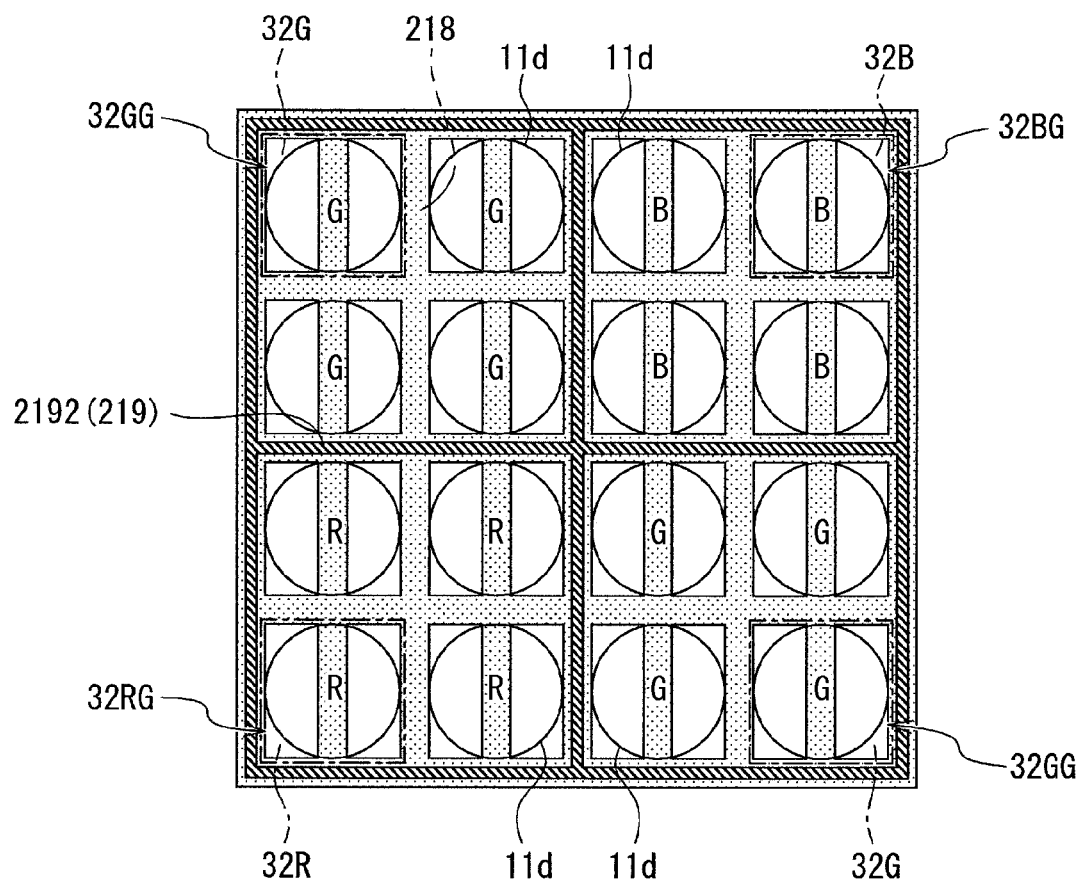
FIG. 13B is a plan view illustrating an arrangement example of the on-chip lenses with respect to the pixel layout illustrated in FIG. 13A.

FIG. 13A is a plan view illustrating a configuration example 4 of the pixel layout according to the first embodiment of the present disclosure. FIG. 13B is a plan view illustrating an arrangement example of the on-chip lenses 11d with respect to the pixel layout illustrated in FIG. 13A. As illustrated in FIGS. 13A and 13B, in the configuration example 4 of the pixel layout, the p-type region 218 is provided in the pixel 32. The p-type region 218 completely separates the inside of one pixel 32 into, for example, a left side region and a right side region. Furthermore, one on-chip lens 11d is arranged in one pixel 32.

Even with such a configuration, because the different color pixels in each of the green pixel group 32GG, the red pixel group 32RG, and the blue pixel group 32BG are separated by the different-color pixel separation part 2192 having the trench isolation structure, the color mixing between the different color pixels can be suppressed.

Note that, in the example 4, the separation in the pixel 32 by the p-type region 218 may be partial in plan view. That is, the configuration example 4 described above may be an aspect of the modified example 1 illustrated in FIG. 14 or an aspect of the modified example 2 illustrated in FIG. 15 described in the following.

Figure 14:
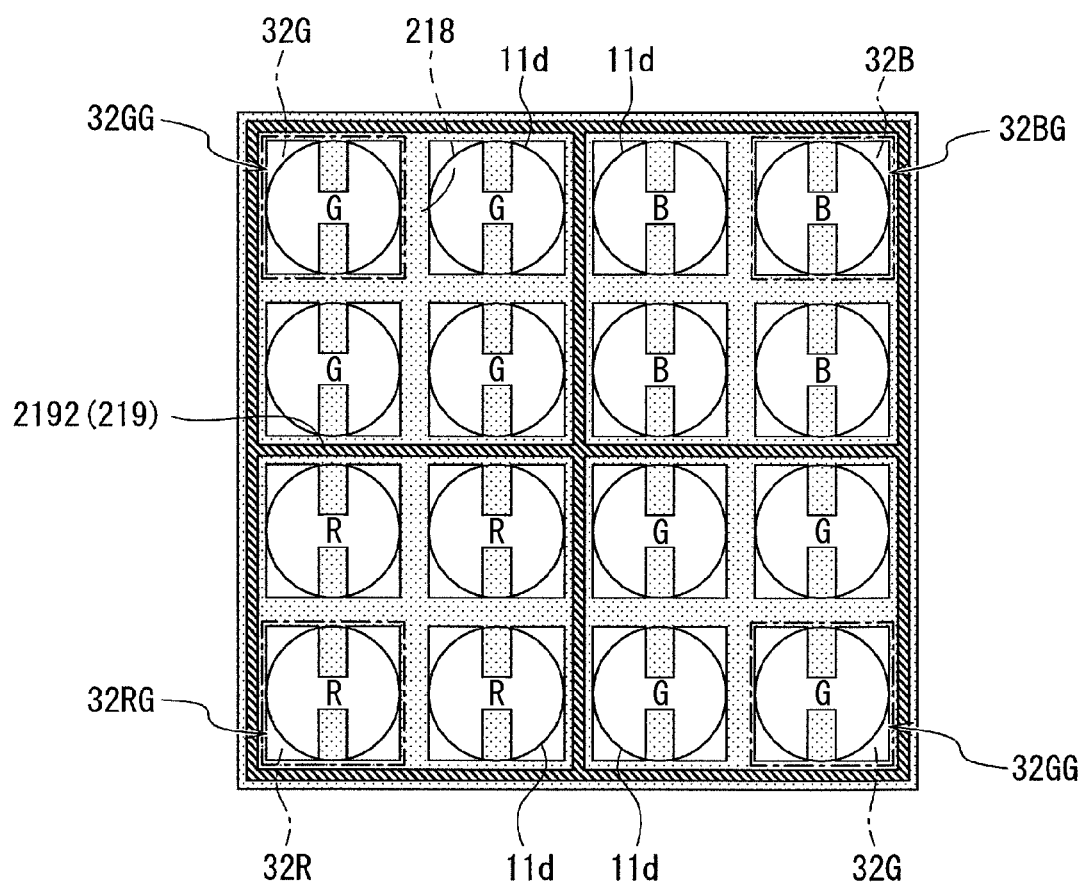
FIG. 14 is a plan view illustrating a modified example 1 of the configuration example 4 of the pixel layout.

FIG. 14 is a plan view illustrating the modified example 1 of the configuration example 4 of the pixel layout. As illustrated in FIG. 14, in each of the green pixel 32G, the red pixel 32R, and the blue pixel 32B, the in-pixel separation by the p-type region 218 is limited to the outer peripheral part in plan view, and the central part may be excluded. For example, the p-type region 218 separates the inside of one pixel 32 into the left side region and the right side region, but this separation is not complete separation but partial separation.

The p-type region 218 is not provided at the central part of each pixel 32, and the left region and the right region are connected via the central part. Even in such an aspect, similarly to the configuration example 4 described above, the color mixing between different color pixels and the color mixing between the same color pixels can be suppressed.

Figure 15:
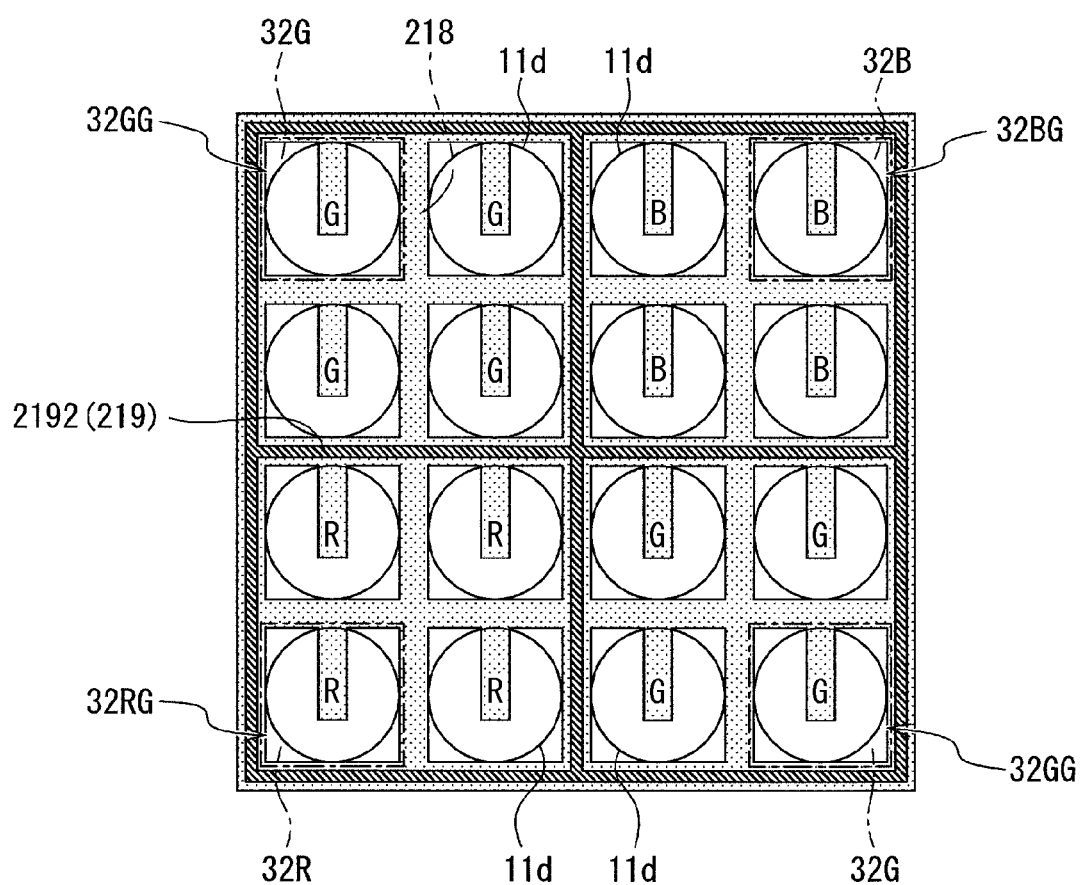
FIG. 15 is a plan view illustrating a modified example 2 of the configuration example 4 of the pixel layout.

FIG. 15 is a plan view illustrating the modified example 2 of the configuration example 4 of the pixel layout. As illustrated in FIG. 15, the p-type region 218 that partially separates the inside of each pixel 32 into the right side region and the left side region may be close to one side (for example, upper side) of each pixel. Even in such an aspect, similarly to the configuration example 4 described above, the color mixing between different color pixels and the color mixing between the same color pixels can be suppressed.

(Configuration of WL Lens)

The shape of the WL lens 30 in plan view may be a circular shape, a rectangular shape, or a rounded rectangular shape. As illustrated in FIG. 2, the WL lens 30 is attached onto the solid-state imaging element 11 with the glass substrate 12, the adhesive 15, the IRCF 14, the adhesive 25, and the like interposed therebetween. Because the attachment uses the adhesive, the vicinity of a corner part of the WL lens 30 tends to be more easily peeled off than other portions. When the corner part of the WL lens 30 is peeled off, the incident light is not appropriately incident on the solid-state imaging element 11, and the flare and ghost possibly occur.

In order to reduce this possibility, the outer dimension of the WL lens 30 may be set to a value smaller than the outer dimension of the solid-state imaging element 11, and moreover, an effective region may be set in the vicinity of the center of the WL lens 30 and a non-effective region may also be set in the outer peripheral part. That is, the outer dimension of the WL lens 30 is made smaller than that of the glass substrate 12 on the solid-state imaging element 11, and a non-effective region 30b is set on the outer peripheral part of the WL lens 30, and an effective region 30a is set inside the non-effective region. With this arrangement, it is possible to realize the WL lens 30 that is hardly peeled off from the solid-state imaging element 11 or can effectively collect the incident light even if the end part is somewhat peeled off.

Note that the effective region 30a has an aspherical shape in the region of the WL lens 30 where the incident light is incident, and is a region that effectively functions to collect the incident light to the region of the solid-state imaging element 11 where the photoelectric conversion is possible. In other words, the effective region 30a is a concentric structure in which the aspherical lens structure is formed, is a region circumscribing the lens outer peripheral part, and is a region in which the incident light is condensed on the imaging surface of the solid-state imaging element 11 where the photoelectrical conversion can be performed. The non-effective region 30b is a region that does not necessarily function as a lens that condenses the incident light incident on the WL lens 30 on a region in the solid-state imaging element 11 where the photoelectrical conversion is performed.

However, in the non-effective region 30b, at the boundary with the effective region 30a, a structure in which a structure functioning as a lens having an aspherical shape is extended is desirably provided in part. As described above, by providing the structure functioning as a lens in the non-effective region 30b in an extending manner to the vicinity of the boundary with the effective region 30a, the incident light can be appropriately condensed on the imaging surface of the solid-state imaging element 11 even if the position shift occurs at the time of adhering or bonding the WL lens 30 to the glass substrate 12 on the solid-state imaging element 11.

As illustrated in FIGS. 1 and 2, the end part of the WL lens 30 is formed perpendicular to the imaging surface of the solid-state imaging element 11. Furthermore, the end part of the WL lens 30 may be formed in another shape as long as the size of the WL lens 30 is set to be smaller than the size of the solid-state imaging element 11, the effective region 30a is set at the central part of the WL lens 30, and the non-effective region 30b is set at the outer peripheral part thereof.

Figure 16:
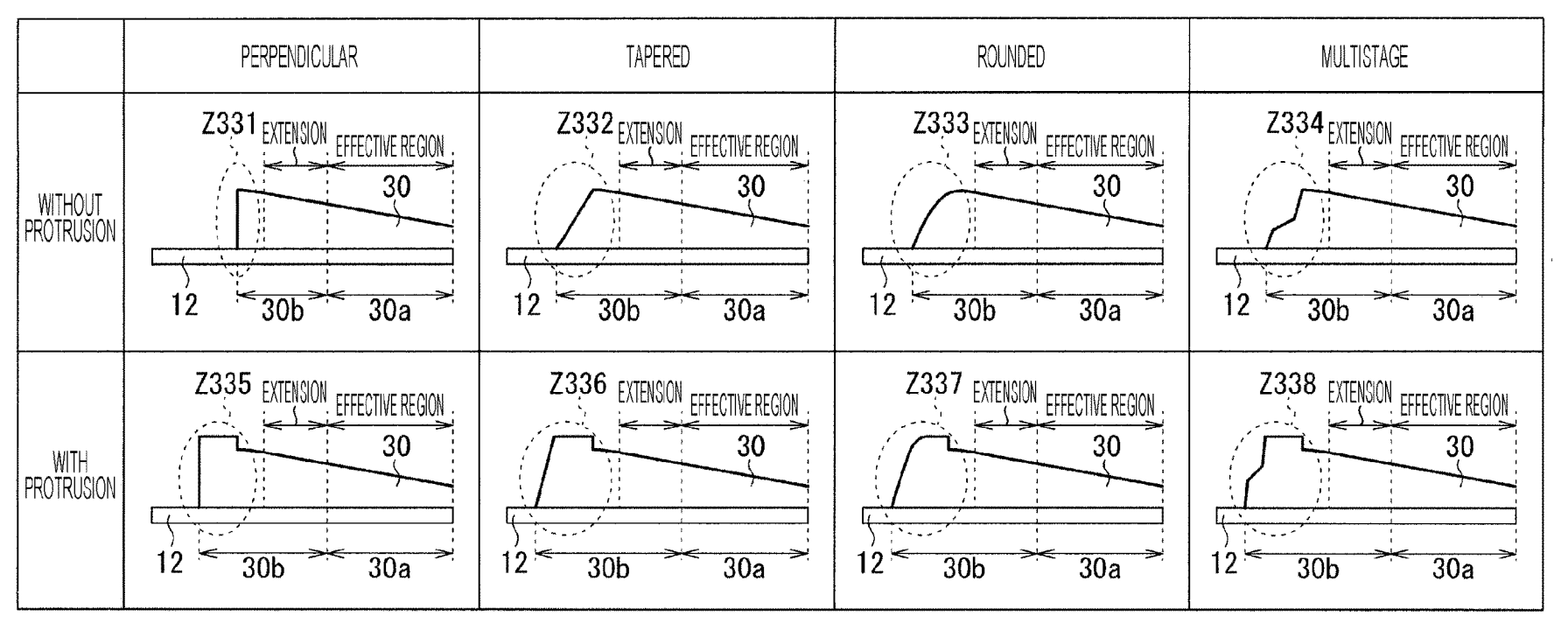

FIG. 16 is a view illustrating configuration examples (part 1) of the end part of the WL lens 30. As illustrated in the upper left part in FIG. 16, at the boundary of the non-effective region 30b with the effective region 30a, the configuration similar to that of the effective region 30a as an aspherical lens may be extended, and the end part may be formed perpendicular as illustrated by an end part Z331 of the non-effective region 30b.

Furthermore, as illustrated in the second upper left part in FIG. 16, at the boundary of the non-effective region 30b with the effective region 30a, the configuration similar to that of the effective region 30a as the aspherical lens may be extended, and the end part may be formed tapered as illustrated by an end part Z332 of the non-effective region 30b.

Moreover, as illustrated in the third upper left part in FIG. 16, at the boundary of the non-effective region 30b with the effective region 30a, the configuration similar to that of the effective region 30a as the aspherical lens may be extended, and the end part may be formed in a rounded shape as illustrated by an end part Z333 of the non-effective region 30b.

Furthermore, as illustrated in the upper right part in FIG. 16, at the boundary of the non-effective region 30b with the effective region 30a, the configuration similar to that of the effective region 30a as the aspherical lens may be extended, and the end part may be formed as a side surface having a multistage structure as illustrated by an end part Z334 of the non-effective region 30b.

Moreover, as illustrated in the lower left part in FIG. 16, at the boundary of the non-effective region 30b with the effective region 30a, the configuration similar to that of the effective region 30a as the aspherical lens may be extended, and as illustrated by an end part Z335 of the non-effective region 30b, the end part may include a bank-shaped protruding part having a horizontal flat surface part and protruding in a direction facing the incident direction of the incident light more than the effective region 30a, and the protruding part may have a side surface formed perpendicular.

Furthermore, as illustrated in the second lower left part in FIG. 16, at the boundary of the non-effective region 30b with the effective region 30a, the configuration similar to that of the effective region 30a as the aspherical lens may be extended, and as illustrated by an end part Z336 of the non-effective region 30b, the end part may include a bank-shaped protruding part having a horizontal flat surface part and protruding in a direction facing the incident direction of the incident light more than the effective region 30a, and the protruding part may have a side surface formed in a tapered shape.

Moreover, as illustrated in the third lower left part in FIG. 16, at the boundary of the non-effective region 30b with the effective region 30a, the configuration similar to that of the effective region 30a of 37 as the aspherical lens may be extended, and as illustrated by an end part Z337 of the non-effective region 30b, the end part may include a bank-shaped protruding part having a horizontal flat surface part and protruding in a direction facing the incident direction of the incident light more than the effective region 30a, and the protruding part may have a side surface formed in a rounded shape.

Furthermore, as illustrated in the lower right part in FIG. 16, at the boundary of the non-effective region 30b with the effective region 30a, the configuration similar to that of the effective region 30a as the aspherical lens may be extended, and as illustrated by an end part Z338 of the non-effective region 30b, the end part may include a bank-shaped protruding part having a horizontal flat surface part and protruding in a direction facing the incident direction of the incident light more than the effective region 30a, and the protruding part may have a side surface formed in a multistage structure.

Note that, in the upper stage in FIG. 16, the structural examples are illustrated in which the bank-shaped protruding part including the horizontal flat surface part is not provided at the end part of the WL lens 30. The lower stage in FIG. 16 illustrates structural examples in which the bank-shaped protruding part including the horizontal flat surface part is provided at the end part of the WL lens 30. In addition, the upper stage and the lower stage in FIG. 16 illustrate, in order from the left, an example in which the end part of the WL lens 30 is configured perpendicular to the glass substrate 12, an example in which the end part is configured in a tapered shape, an example in which the end part is configured in a rounded shape, and an example in which the end part is configured in a multistage structure having a plurality of side surfaces.

FIG. 17 is a view illustrating configuration examples (part 2) of the end part of the WL lens 30. As illustrated in the upper part in FIG. 17, at the boundary of the non-effective region 30b with the effective region 30a, the configuration similar to that of the effective region 30a as the aspherical lens may be extended, and as illustrated by an end part Z351 of the non-effective region 30b, the protruding part may be configured perpendicular to the glass substrate 12, and moreover, may leave a rectangular boundary structure Es at the boundary of the solid-state imaging element 11 with the glass substrate 12.

Moreover, as illustrated in the lower part in FIG. 17, at the boundary of the non-effective region 30b with the effective region 30a, the configuration similar to that of the effective region 30a as the aspherical lens may be extended, and as illustrated by an end part Z352 of the non-effective region 30b, the protruding part may be configured perpendicular to the glass substrate 12, and moreover, may leave a rounded boundary structure Er at the boundary of the solid-state imaging element 11 with the glass substrate 12.

In any of the rectangular boundary structure Es and the rounded boundary structure Er, by increasing the contact area between the WL lens 30 and the glass substrate 12, the WL lens 30 and the glass substrate 12 can be more closely attached and bonded, and as a result, the peeling of the WL lens 30 from the glass substrate 12 can be suppressed.

Note that the rectangular boundary structure Es and the rounded boundary structure Er may be used in any of a case where the end part is formed in a tapered shape, a case where the end part is formed in a rounded shape, and a case where the end part is formed in a multistage structure.

FIG. 18 is a view illustrating configuration examples (part 3) of the end part of the WL lens 30. As illustrated in FIG. 18, at the boundary of the non-effective region 30b with the effective region 30a, the configuration similar to that of the effective region 30a as the aspherical lens may be extended, and as illustrated by an end part Z371 of the non-effective region 30b, the WL lens 30 may have a side surface configured perpendicular to the glass substrate 12, and moreover, at the outer peripheral part thereof, a refractive film 351 having a predetermined refractive index may be provided on the glass substrate 12 at a height substantially the same as that of the WL lens 30.

With this arrangement, for example, in a case where the refractive film 351 has a refractive index higher than the predetermined refractive index, in a case where incident light is incident from the outer peripheral part of the WL lens 30 as indicated by a solid arrow in the upper part in FIG. 18, the incident light is reflected to the outside of the WL lens 30, and meanwhile, the incident light incident on the side surface part of the WL lens 30 is reduced as indicated by a dotted arrow. As a result, because entry of the stray light into the WL lens 30 is suppressed, occurrence of the flare and ghost is suppressed.

Furthermore, in a case where the refractive film 351 has a refractive index lower than the predetermined refractive index, as indicated by a solid arrow in the lower part of FIG. 18, light that is not incident on the incident surface of the solid-state imaging element 11 and is about to be transmitted from the side surface of the WL lens 30 to the outside of the WL lens 30 is transmitted, and meanwhile, reflected light from the side surface of the WL lens 30 is reduced as indicated by a dotted arrow. As a result, because entry of the stray light into the WL lens 30 is suppressed, occurrence of the flare and ghost can be suppressed.

Moreover, in FIG. 18, an example has been described in which the refractive film 351 is formed at the same height as the WL lens 30 on the glass substrate 12 and has the end part formed perpendicular, but the refractive film may have other shapes.

Figure 19:
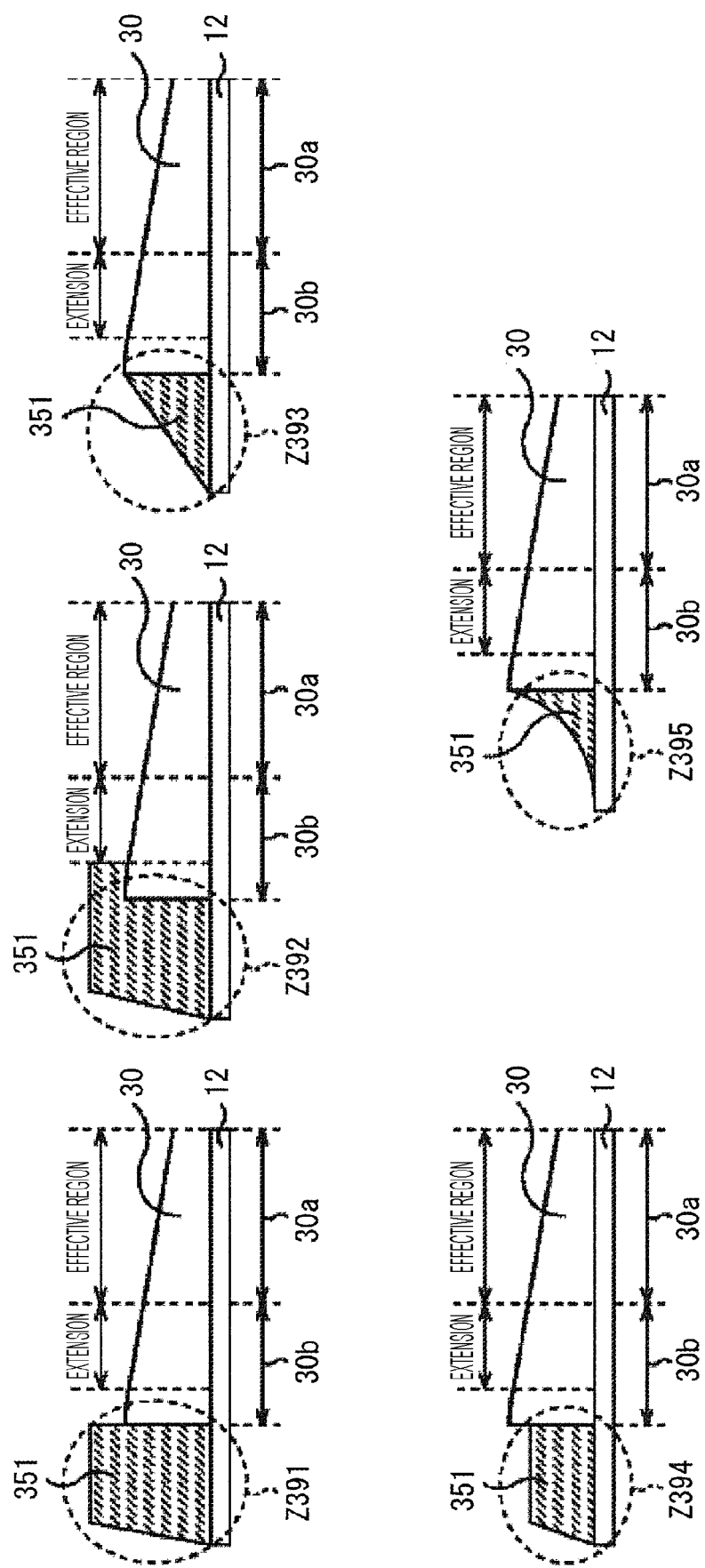
FIG. 19 is a view illustrating configuration examples (part 4) of the end part of the WL lens 30.

FIG. 19 is a view illustrating configuration examples (part 4) of the end part of the WL lens 30. For example, as indicated by a region Z391 in the upper left part in FIG. 19, the refractive film 351 may have a tapered shape formed at the end part on the glass substrate 12, and may have a thickness larger than the height of the end part of the WL lens 30.

Furthermore, for example, as indicated by a region Z392 in the upper center part in FIG. 19, the refractive film 351 may have a tapered shape formed at the end part, may have a thickness larger than the height of the end part of the WL lens 30, and moreover, may have a part overlapping the non-effective region 30b of the WL lens 30.

Moreover, for example, as indicated by a region Z393 in the upper right part in FIG. 19, the refractive film 351 may have a tapered shape formed from the height of the end part of the WL lens 30 to the end part of the glass substrate 12.

Furthermore, for example, as indicated by a region Z394 in the lower left part in FIG. 19, the refractive film 351 may have a tapered shape formed at the end part on the glass substrate 12, and may have a thickness smaller than the height of the end part of the WL lens 30.

Moreover, for example, as indicated by a region Z395 in the lower right part in FIG. 19, the refractive film 351 may have a concave and rounded shape formed from the height of the end part of the WL lens 30 toward the glass substrate 12.

In any of the configurations in FIGS. 18 and 19, because entry of the stray light into the WL lens 30 is suppressed, occurrence of the flare and ghost can be suppressed.

(Modified Example of Concave Lens)

Figure 20:
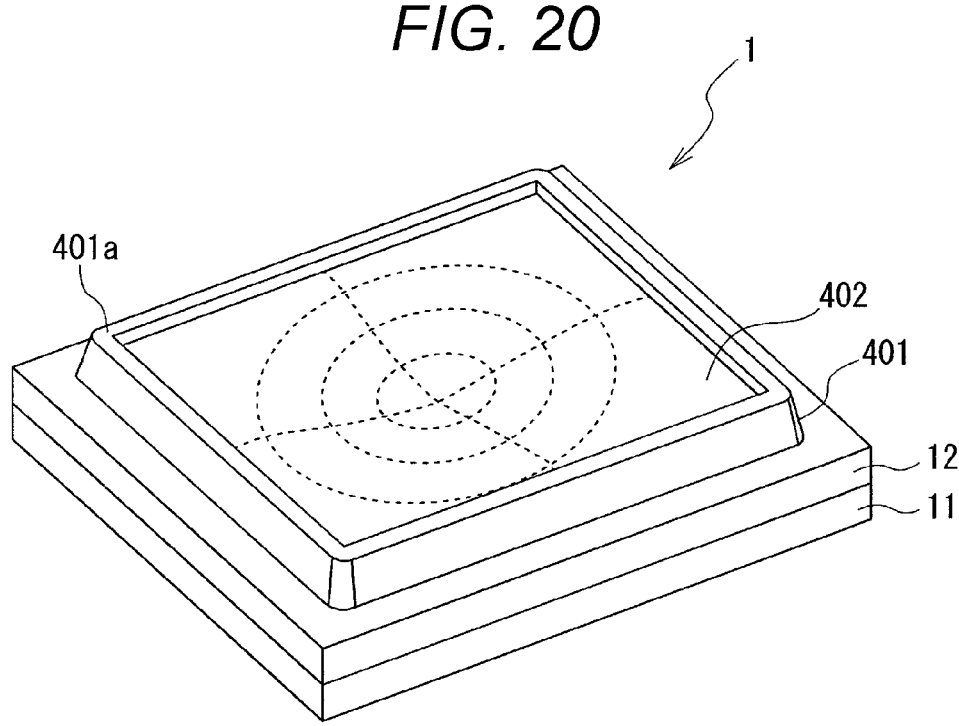
FIG. 20 is a view illustrating a modified example of the imaging device according to the first embodiment of the present disclosure.

In the embodiment of the present disclosure, as the concave lens of the present disclosure, a lens 401 described below may be used instead of the WL lens 30. FIG. 20 is a view illustrating a modified example of the imaging device 1 according to the first embodiment of the present disclosure.

As illustrated in FIG. 20, the concentric aspherical concave lens 401 centered on the centroid position as viewed from the upper surface may be formed on the glass substrate 12 on the solid-state imaging element 11. In addition, in the lens 401, an anti reflection (AR) coating 402 is formed on a surface on which light is incident, and a protruding part 401a is formed on an outer peripheral part. Because the AR coating 402 suppresses the internal irregular reflection of reflected light from the solid-state imaging element 11, occurrence of the flare and ghost can be suppressed with higher accuracy.

The AR coating 402 is a single layer film or a multilayer structure film, and includes, for example, resin such as a transparent silicone-based resin, an acryl-based resin, an epoxy-based resin, a styrene-based resin, an insulating film containing silicon (Si), carbon (C), or hydrogen (H) as a main component (for example, SiCH, SiCOH, SiCNH), an insulating film containing silicon (Si) or nitrogen (N) as a main component (for example, SiON, SiN), an $SiO_2$ film formed using at least one material gas such as silicon hydroxide, alkylsilane, alkoxysilane, or polysiloxane and an oxidizing agent, a single layer film such as a P—SiO film or an HDP-SiO film, or a multilayer laminated film including one or more types of films selected from these. The AR coating 402 can employ, for example, vacuum deposition, sputtering, WET coating, or the like.

Figure 21:
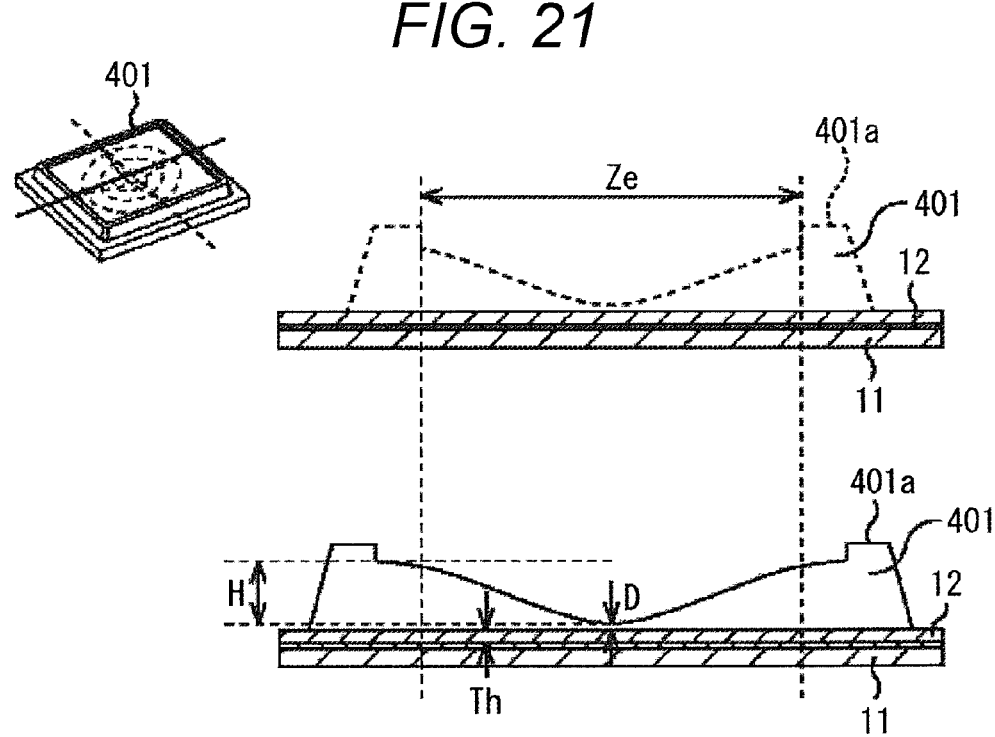
FIG. 21 is a view illustrating configuration examples (part 1) of a concave lens 401.

FIG. 21 is a view illustrating configuration examples (part 1) of the concave lens 401. As illustrated in FIG. 21, the lens 401 has a conical shape with an aspherical concave shape centered on the centroid position as viewed from the upper surface. Note that, in FIG. 21, the upper right part in the drawing illustrates the cross-sectional shape of the lens 401 in the direction indicated by the dotted line in the upper left part in the drawing, and the lower right part in the drawing illustrates the cross-sectional shape of the lens 401 in the direction indicated by the solid line in the upper left part in the drawing.

In FIG. 21, a range Ze of the lens 401 has a common aspherical curved surface structure in the upper right part and the lower right part in FIG. 21, and such a shape constitutes an effective region for condensing the incident light from the upper side in the drawing on the imaging surface of the solid-state imaging element 11.

In addition, because the lens 401 includes the aspherical curved surface, the thickness changes according to the distance from the central position in the direction perpendicular to the incident direction of light. More specifically, at the central position, the lens thickness is a thickness D which is the thinnest, and the lens thickness at the position farthest from the center in the range Ze is a thickness H which is the thickest. Furthermore, in a case where the thickness of the glass substrate 12 is the thickness Th, the thickest thickness H of the lens 401 is thicker than the thickness Th of the glass substrate 12, and the thinnest thickness D of the lens 401 is thinner than the thickness Th of the glass substrate 12.

That is, in summary of these relationships, because the lens 401 and the glass substrate 12 that satisfy the relationship of thickness H>thickness Th>thickness D are used for the thicknesses D, H, and Th, (the integrated configuration part 10 of) the imaging device 1 that is small in size and light in weight and can perform imaging with high resolution can be realized.

Furthermore, by making a volume VG of the glass substrate 12 smaller than a volume VL of the lens 401, the volume of the lens can be most efficiently formed, and thus, the imaging device 1 that is small and lightweight and can perform imaging with high resolution can be realized.

In the above, an example has been described, as illustrated in FIG. 21, in which the imaging device 1 that is small and lightweight and can perform imaging with high resolution is constituted by the concave lens 401 including the protruding part 401*a* provided with a taper at the outer peripheral part. However, as long as the thicknesses D, H, and Th of the lens 401 and the glass substrate 12 satisfy the relationship of thickness H>thickness Th>thickness D, the shape of the lens 401 may be another shape. Furthermore, it is more preferable that the volumes VG and VL satisfy the relationship of volume VG<volume VL.

Figure 22:
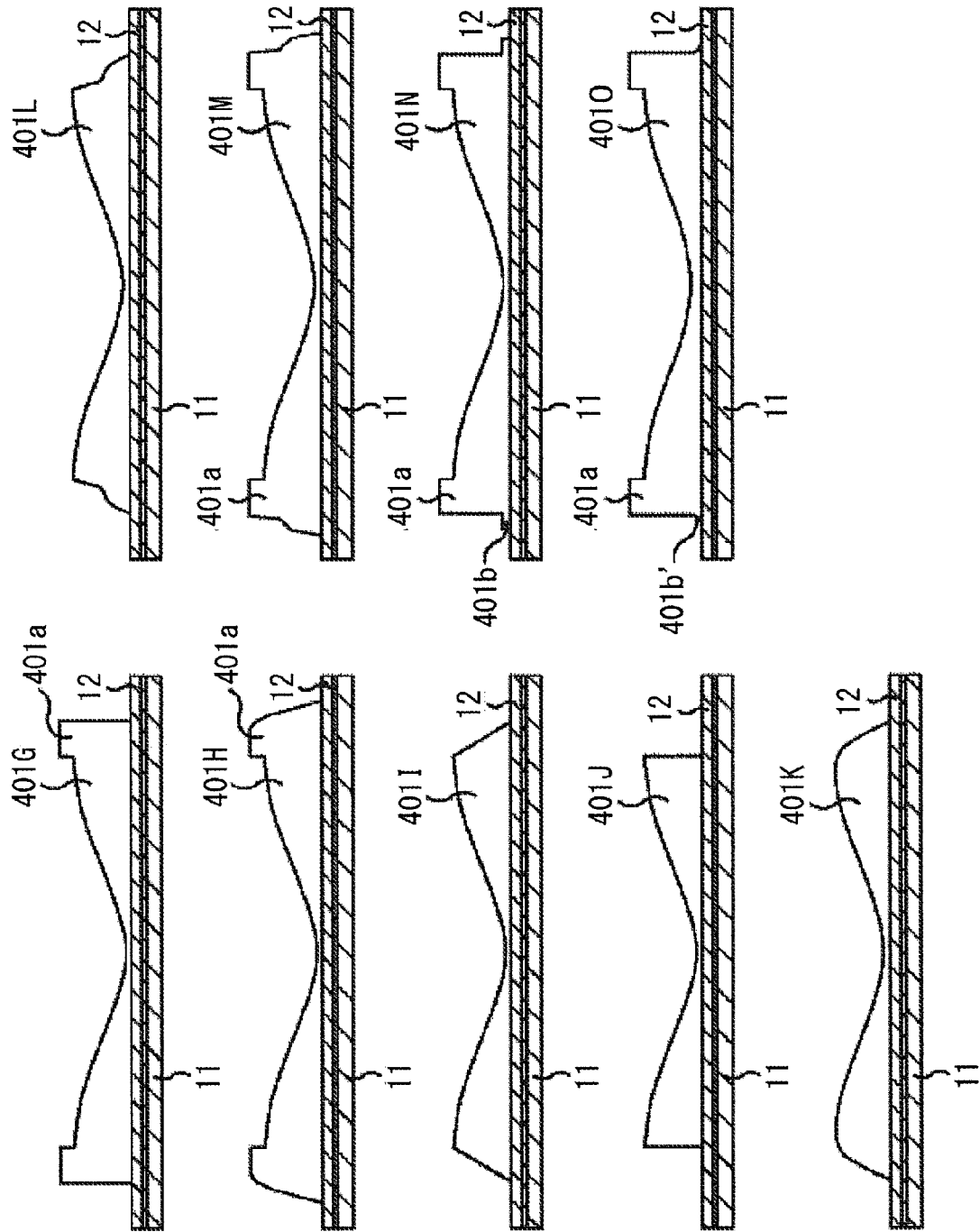
FIG. 22 is a view illustrating configuration examples (part 2) of the concave lens 401.

FIG. 22 is a view illustrating configuration examples (part 2) of the concave lens 401. For example, as illustrated by a lens 401G in FIG. 22, the side surface on the outer peripheral side of the protruding part 401*a* may form a right angle with respect to the glass substrate 12, and may not include a taper.

Furthermore, as illustrated by a lens 401H in FIG. 22, the side surface on the outer peripheral side of the protruding part 401*a* may include a rounded taper.

Moreover, as illustrated by a lens 401I in FIG. 22, the lens may not include the protruding part 401*a* itself and the side surface may have a linear tapered shape forming a predetermined angle with respect to the glass substrate 12.

Furthermore, as illustrated by a lens 401J in FIG. 22, the lens may not include the protruding part 401*a* itself and the side surface may form a right angle with respect to the glass substrate 12, and may not have a tapered shape.

Moreover, as illustrated by a lens 401K in FIG. 22, the lens may not include the protruding part 401*a* itself and the side surface may have a rounded tapered shape with respect to the glass substrate 12.

Furthermore, as illustrated by a lens 401L in FIG. 22, the lens may not include the protruding part 401*a* itself and the side surface of the lens may have a two-stage configuration having two inflection points. In addition, because the side surface of the lens 401L has a two-stage configuration having two inflection points, the lens may be referred to as a two-stage side surface type lens.

Moreover, as illustrated by a lens 401M in FIG. 22, the lens may include the protruding part 401*a*, and the side surface of the lens may have a two-stage configuration having two inflection points on the outer side surface.

Furthermore, as illustrated by a lens 401N in FIG. 22, the lens may include the protruding part 401*a*, and the side surface may form a right angle with respect to the glass substrate 12, and moreover, is added with a rectangular hem part 401*b* near the boundary with the glass substrate 12.

Moreover, as illustrated by a lens 401N in FIG. 22, the lens may include the protruding part 401*a*, and the side surface may form a right angle with respect to the glass substrate 12, and is added with a rounded hem part 401*b'* near the boundary with the glass substrate 12.

Furthermore, a light shielding film may be formed so as to cover the protruding part 401*a* and the side surface of the lens 401 to suppress the occurrence of side surface flare.

Figure 23:
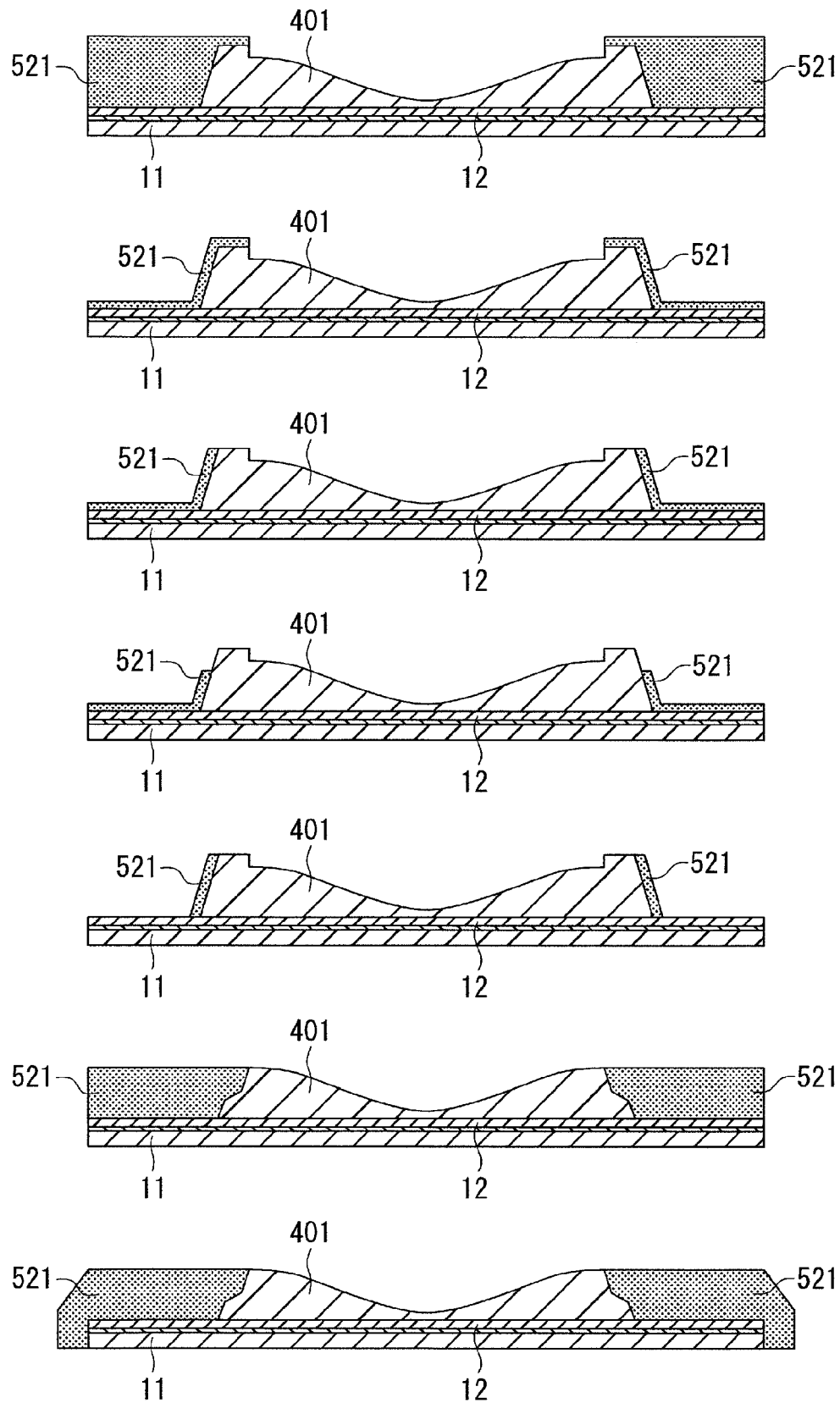
FIG. 23 is a view illustrating configuration examples of a light shielding film arranged on a side surface or the like of the concave lens 401.

FIG. 23 is a view illustrating configuration examples of a light shielding film 521 arranged on the side surface or the like of the concave lens 401. For example, as illustrated in the uppermost stage in FIG. 23, the light shielding film 521 may be formed on the glass substrate 12 in the entire range up to the height of the side surface of the lens 401 and the flat surface part of the upper surface of the protruding part 401*a*, that is, in a range other than the effective region.

Furthermore, as illustrated in the second from the top in FIG. 23, the light shielding film 521 may be formed on the glass substrate 12 in the entire surface up to the side surface of the lens 401 and the flat surface part of the upper surface of the protruding part 401*a*, that is, in the entire surface portion other than the effective region.

Moreover, as illustrated in the third from the top in FIG. 23, the light shielding film 521 may be formed on the side surface of the protruding part 401*a* of the lens 401 from the glass substrate 12.

Furthermore, as illustrated in the fourth from the top in FIG. 23, the light shielding film 521 may be formed over a range up to a predetermined height of the glass substrate 12, in the side surface of the protruding part 401*a* of the lens 401 from the glass substrate 12.

Moreover, as illustrated in the fifth from the top in FIG. 23, the light shielding film 521 may be formed only on the side surface of the protruding part 401*a* of the lens 401.

Furthermore, as illustrated in the sixth from the top in FIG. 23, the light shielding film 521 may be formed in a range up to the highest position of the two side surfaces of the two-stage side surface type lens 401 on the glass substrate 12.

Moreover, as illustrated in the seventh from the top in FIG. 23, the light shielding film 521 may be formed in the entire surface up to the highest position of the two side surfaces of the two-stage side surface type lens 401 on the glass substrate 12 and may also be formed so as to cover the outer peripheral portion of the solid-state imaging element 11.

The light shielding film 521 may be formed by partial film formation, may be formed by lithography after film formation, or may be formed by forming a film after forming a resist and lifting off the resist.

Effect of First Embodiment

As described above, the imaging device 1 according to the first embodiment of the present disclosure includes: the silicon substrate 101 (an example of a "semiconductor substrate" in the present disclosure); the plurality of pixels 32 provided on the semiconductor substrate 101 and arranged side by side in a direction parallel to one surface (for example, the back surface) of the semiconductor substrate 101; the inter-pixel separation part 219 provided on the semiconductor substrate 101 and separating adjacent pixels 32 among the plurality of pixels 32; the color filters 11*c* provided on a side of the one surface of the semiconductor substrate 101; the plurality of on-chip lenses 11*d* provided on the side of the one surface of the semiconductor substrate 101 with the color filters 11*c* interposed therebetween, and arranged side by side in the direction parallel to the one surface; and the WL lens 30 (or the lens 401) provided on the side of the one surface of the semiconductor substrate 101 with the color filters and the plurality of on-chip lenses 11d interposed therebetween.

The color filters 11c includes the G filter that transmits green light, the R filter that transmits red light, and the B filter that transmits blue light. The plurality of pixels 32 includes the green pixel 32G in which the G filter is arranged, the red pixel 32R in which the R filter is arranged, and the blue pixel 32B in which the B filter is arranged.

The inter-pixel separation part 219 includes the same-color pixel separation part 2191 arranged between the adjacent pixels 32 of the same color among the green pixel 32G, the red pixel 32R, and the blue pixel 32B, and the different-color pixel separation part 2192 arranged between the adjacent pixels 32 of different colors among the green pixel 32G, the red pixel 32R, and the blue pixel 32B. The different-color pixel separation part 2192 has the trench isolation structure.

With this arrangement, the WL lens 30 can relax the incident angle of the light incident on the pixel 32 on the high image height side (that is, the pixel 32 arranged at a position away from the central part of the pixel region 21), and can bring the incident angle on the high image height side close to 0° (that is, perpendicular to the back surface of the silicon substrate 101 being the light receiving surface). Therefore, the color mixing between the adjacent pixels can be suppressed on the high image height side. Furthermore, because the adjacent different color pixels are separated by the trench isolation structure, the color mixing can be further suppressed. With this arrangement, the output difference between the adjacent pixels of the same color can be reduced, and thus, for example, the deterioration of image quality at the time of remosaicing in which the pixel array of the input image is converted into a different pixel array can be suppressed.

Furthermore, at least a part (that is, a part or all) of the same-color pixel separation part 2191 may have the trench isolation structure. With this arrangement, because not only the adjacent different color pixels but also the adjacent same color pixels are separated by the trench isolation structure, the color mixing can be further suppressed.

Second Embodiment

In the first embodiment described above, as illustrated in FIG. 7, it has been described that the trench constituting the inter-pixel separation part 219 is open to the back surface (in FIG. 7, the upper surface) of the silicon substrate 101 and has the bottom surface in the silicon substrate 101. That is, it has been described that the inter-pixel separation part 219 is formed up to a middle position in the thickness direction of the silicon substrate 101 and does not penetrate the silicon substrate 101. However, the embodiment of the present disclosure is not limited thereto. The trench constituting the inter-pixel separation part may penetrate between one surface (for example, the back surface) of the semiconductor substrate and the other surface (for example, the front surface) of the semiconductor substrate located on the opposite side of the one surface. That is, the inter-pixel separation part may penetrate the semiconductor substrate.

Figure 24:
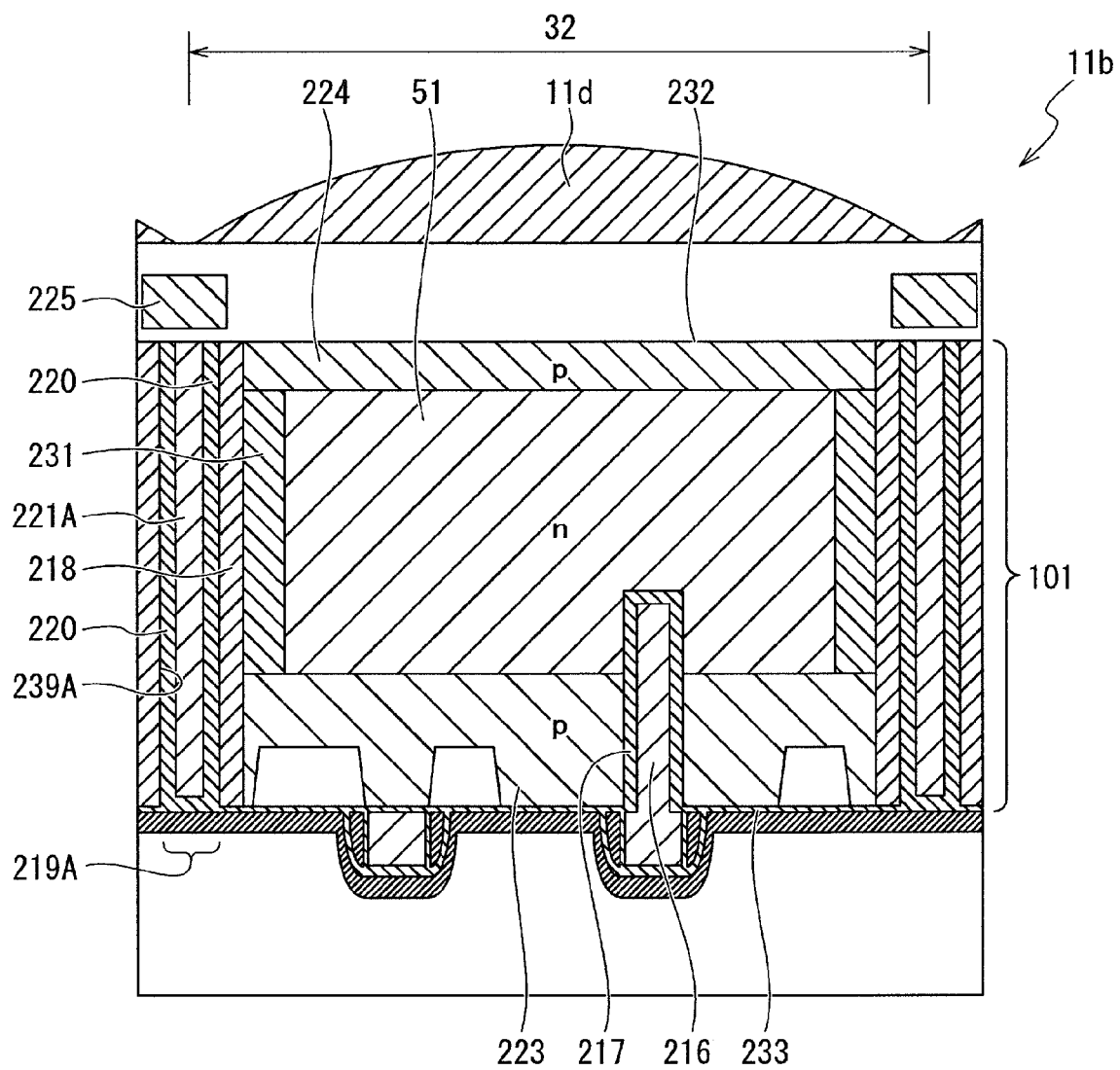
FIG. 24 is a cross-sectional view illustrating a configuration example of a pixel sensor substrate according to a second embodiment of the present disclosure.

FIG. 24 is a cross-sectional view illustrating a configuration example of a pixel sensor substrate 11b according to the second embodiment of the present disclosure. As illustrated in FIG. 24, the pixel sensor substrate 11b according to the second embodiment is of a back-illuminated type, and a silicon substrate 101 is provided with a photodiode 51 and an inter-pixel separation part 219A surrounding the photodiode 51. The inter-pixel separation part 219 has the trench isolation structure and penetrates the silicon substrate 101.

For example, the inter-pixel separation part 219 includes a trench 239A provided in a p-type region 218, an insulating film 230 provided on the inner wall of the trench 239A, and a polysilicon film 221A (an example of a "filling film" of the present disclosure) embedded in the trench 239A with the insulating film 230 interposed therebetween. The insulating film 230 is, for example, a silicon oxide film ($SiO_2$ film). The trench 239A penetrates between a back surface 232 and a front surface 233 of the silicon substrate 101. With this arrangement, the inter-pixel separation part 219 may penetrate the silicon substrate 101.

The p-type region 218 and an n-type region 231 are formed in this order between the photodiode 51 and the inter-pixel separation part 219A from the side of the inter-pixel separation part 219A toward the photodiode 51. In addition, the p-type region 218 is in contact with the back surface 232 of the silicon substrate 101, but the n-type region 231 is not in contact with the back surface 232. A p-type region 224 is interposed between the n-type region 231 and the back surface 232. With this arrangement, weakening of pinning on the back surface 232 is suppressed, and deterioration of dark characteristics (for example, generation of white spots and dark current) caused by generated charges flowing into the photodiode 51 can be suppressed.

Note that, in the inter-pixel separation part 219A, SiN may be used as the insulating film 230 instead of the $SiO_2$ film. Furthermore, the insulating film 230 may be a fixed charge film, and a material similar to the fixed charge film 220 (see, for example, FIG. 7) described above can be used as a specific material thereof. In addition, doping polysilicon may be used instead of the polysilicon film 221A used for the filling film. In a case where the doping polysilicon is used, or in a case where the n-type impurities or p-type impurities are doped after the polysilicon film is formed, application of a negative bias to the filling film can strengthen the pinning on the side wall of the inter-pixel separation part 219A, and thus, the dark characteristics can be further improved.

Also in the second embodiment, a WL lens 30 can relax the incident angle of the light incident on a pixel 32 on the high image height side, and can bring the incident angle on the high image height side close to 0°. Therefore, the color mixing between the adjacent pixels can be suppressed on the high image height side. Furthermore, in the second embodiment, the structure of the inter-pixel separation part 219A penetrating the silicon substrate 101 is used for a different-color pixel separation part 2192 (see FIGS. 8A, 8B, 9A, 9B, 10A, 10B, 11, 12, 13A, 13B, 14, [to] and 15). Because the adjacent different color pixels are separated by the trench isolation structure penetrating the silicon substrate 101, the color mixing can be further suppressed. With this arrangement, the output difference between the adjacent pixels of the same color can be reduced, and thus, for example, the deterioration of image quality at the time of remosaicing in which the pixel array of the input image is converted into a different pixel array can be suppressed.

Furthermore, not only the different-color pixel separation part 2192, but also in a same-color pixel separation part 2191 (see FIGS. 8A, 8B, 9A, 9B, 10A, 10B, 11, 12, 13A, 13B, 14, and 15), the structure of the inter-pixel separation part 219A penetrating the silicon substrate 101 may also be used for at least a part thereof. With this arrangement, because not only the adjacent different color pixels but also the adjacent same color pixels are separated by the trench isolation structure penetrating the silicon substrate 101, the color mixing can be further suppressed.

<Application Example to Electronic Device>

The imaging device 1 (for example, see FIG. 1) described above can be applied to various types of electronic devices such as, for example, an imaging device such as a digital still camera and a digital video camera, a mobile phone with an imaging function, or other devices having an imaging function.

Figure 25:
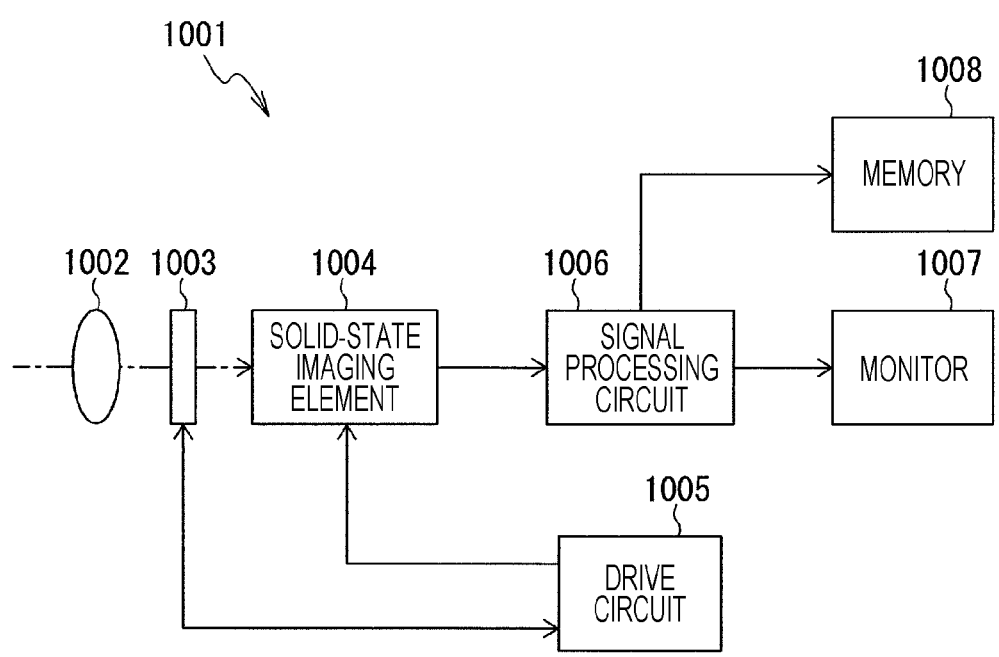
FIG. 25 is a block diagram illustrating a configuration example of the imaging device as an electronic device to which the present technology is applied.

FIG. 25 is a block diagram illustrating a configuration example of the imaging device as the electronic device to which the present technology is applied. An imaging device 1001 illustrated in FIG. 25 includes an optical system 1002, a shutter device 1003, a solid-state imaging element 1004, a drive circuit 1005, a signal processing circuit 1006, a monitor 1007, and a memory 1008 and can capture a still image and a moving image.

The optical system 1002 includes one or a plurality of lenses, and guides light from a subject (incident light) to the solid-state imaging element 1004 to form an image on a light receiving surface of the solid-state imaging element 1004.

The shutter device 1003 is arranged between the optical system 1002 and the solid-state imaging element 1004, and controls a light application period to the solid-state imaging element 1004 and a light shielding period according to control of the drive circuit 1005.

The solid-state imaging element 1004 includes a package including the above-described solid-state imaging element. The solid-state imaging element 1004 stores signal charges for a certain period according to the light forming the image on the light receiving surface via the optical system 1002 and the shutter device 1003. The signal charges stored in the solid-state imaging element 1004 are transferred according to a drive signal (timing signal) supplied from the drive circuit 1005.

The drive circuit 1005 outputs the drive signal that controls a transfer operation of the solid-state imaging element 1004 and a shutter operation of the shutter device 1003 to drive the solid-state imaging element 1004 and the shutter device 1003.

The signal processing circuit 1006 performs various types of signal processing on the signal charges output from the solid-state imaging element 1004. The image (image data) obtained by the signal processing applied by the signal processing circuit 1006 is supplied to the monitor 1007 to be displayed or supplied to the memory 1008 to be stored (recorded).

Also in the imaging device 1001 configured as described above, by applying the imaging device 1 instead of the optical system 1002 and the solid-state imaging element 1004 described above, the color mixing between the adjacent pixels can be suppressed while achieving downsizing and height reduction of the device configuration.

<Usage Example of Imaging Device>

Figure 26:
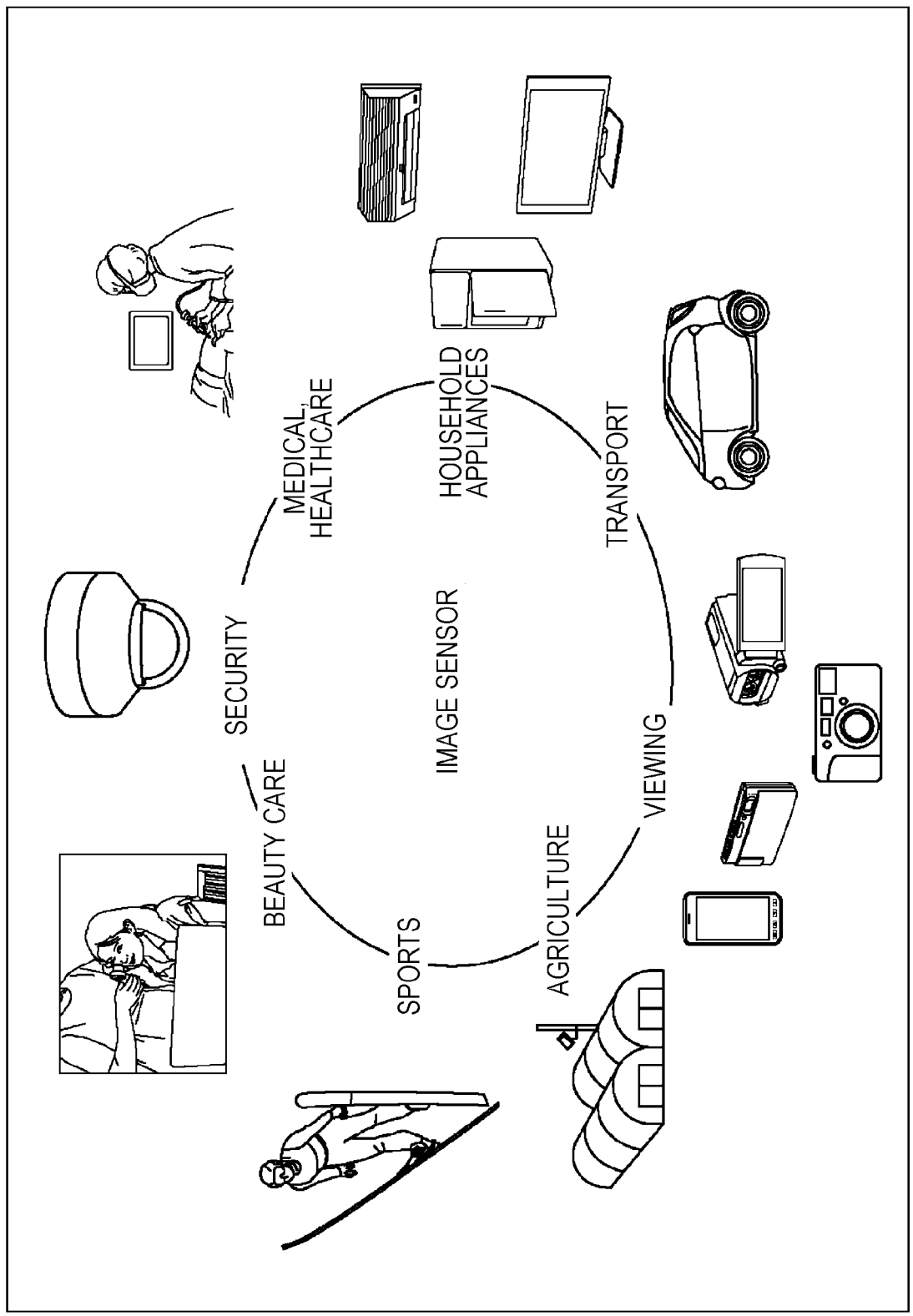
FIG. 26 is a view illustrating a usage example of using the above-described imaging device 1.

FIG. 26 is a diagram illustrating a usage example of using the above-described imaging device 1. The above-described imaging device 1 can be used in various cases in which, for example, light such as visible light, infrared light, ultraviolet light, and X-ray is sensed as described below.

A device that captures an image to be used for viewing such as a digital camera and a portable device with a camera function A device used for traffic, such as an onboard sensor that captures images of the front, rear, surroundings, interior, and the like of an automobile for safe driving such as automatic stop, recognition of a condition of a driver, and the like, a monitoring camera that monitors traveling vehicles and roads, a distance measuring sensor that measures a distance between vehicles, and the like A device used for home electric appliances such as a television, a refrigerator, and an air conditioner in order to capture an image of a gesture of a user and perform device operation according to the gesture A device for medical and healthcare use such as an endoscope and a device that performs angiography by receiving infrared light A device for security use such as a security monitoring camera and an individual authentication camera A device for beauty care such as a skin condition measuring instrument that captures images of skin and a microscope that captures images of scalp A device for sports use such as an action camera and a wearable camera for sports applications and the like A device for agricultural use such as a camera for monitoring conditions of fields or crops.

<Example of Application to Endoscopic Surgery System>

The technology of the present disclosure (present technology) can be applied to various products. For example, the technology of the present disclosure may be applied to an endoscopic surgery system.

Figure 27:
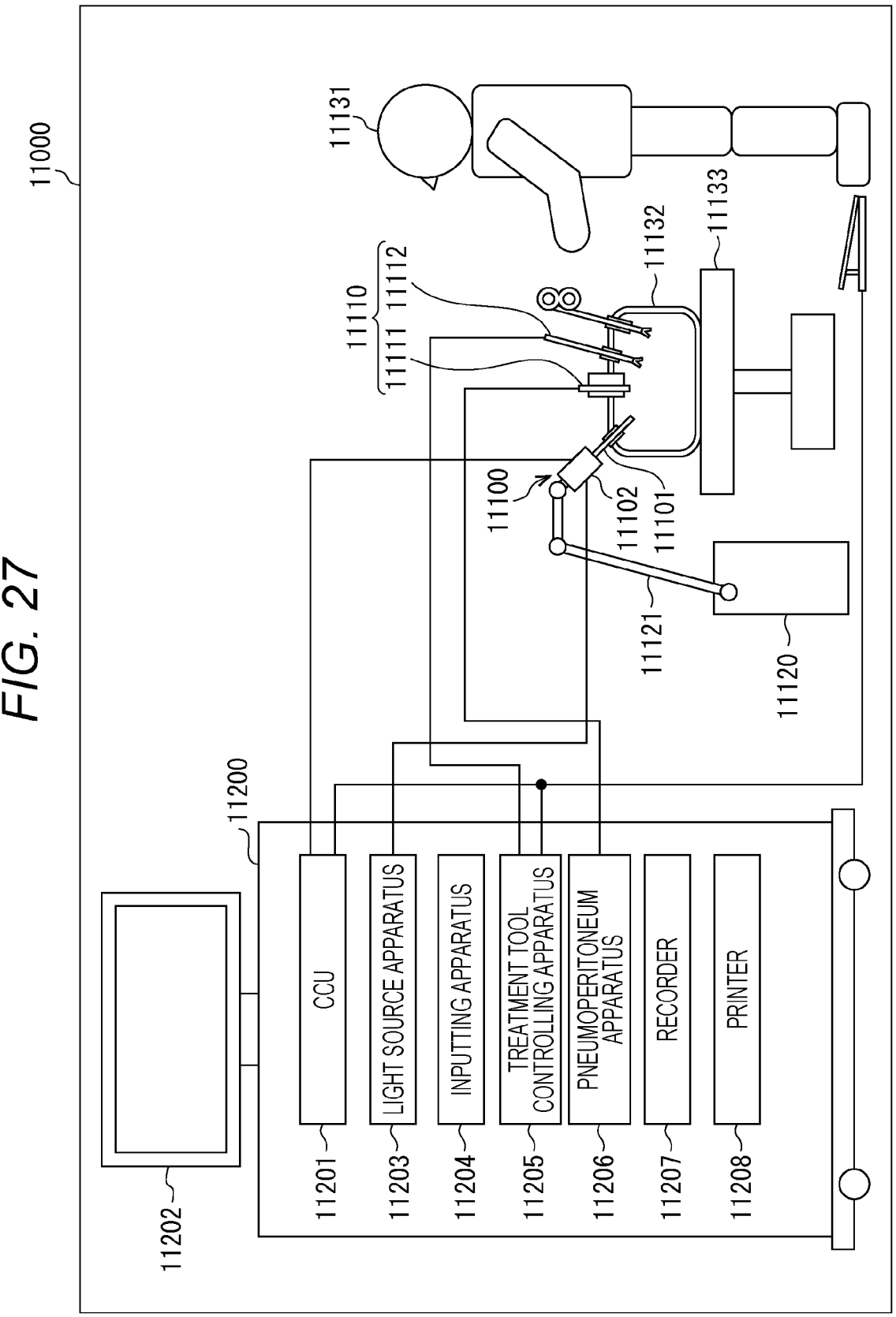
FIG. 27 is a view illustrating an example of a schematic configuration of an endoscopic surgery system to which the technology according to the present disclosure (present technology) can be applied.

FIG. 27 is a view illustrating an example of a schematic configuration of an endoscopic surgery system to which the technology according to the present disclosure (the present technology) can be applied.

In FIG. 27, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as, a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 28:
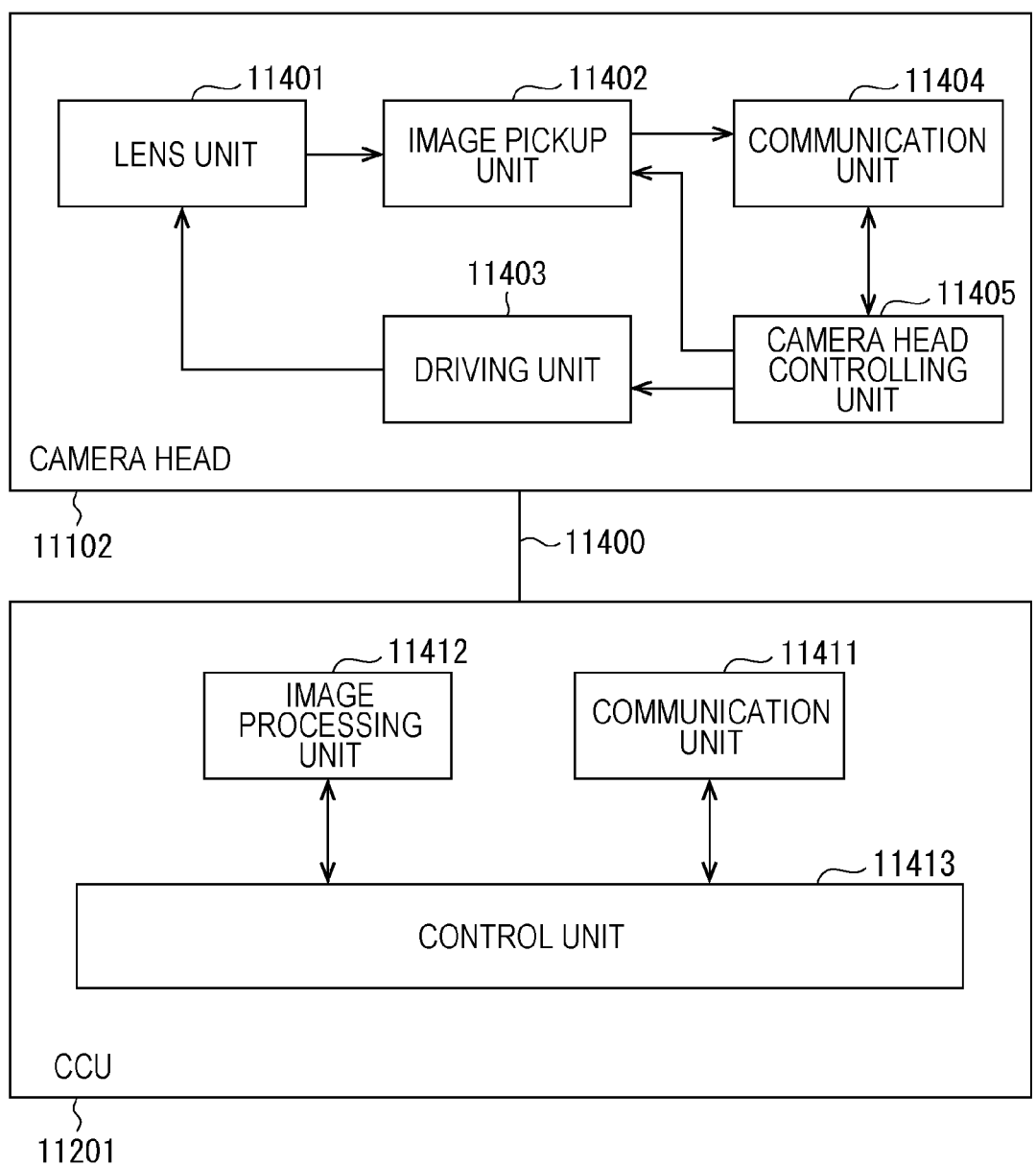
FIG. 28 is a block diagram illustrating an example of a functional configuration of a camera head and a camera control unit (CCU) illustrated in FIG. 27.

FIG. 28 is a block diagram illustrating an example of a functional configuration of the camera head 11102 and the CCU 11201 illustrated in FIG. 27.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The image pickup unit 11402 includes an image pickup element. The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. Alternatively, the image pickup unit 11402 may also be configured so as to have a pair of image pickup elements for respectively acquiring image signals for the right eye and the left eye applicable for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the technology according to the present disclosure can be applied has been described above. The technology according to the present disclosure can be applied to, for example, the endoscope 11100, the image pickup unit 11402 of the camera head 11102, the image processing unit 11412 of the CCU 11201, and the like among the above-described configurations. Specifically, the imaging device 1 described above can be applied to the image pickup unit 10402. By applying the technology according to the present disclosure to the endoscope 11100, the image pickup unit 11402 of the camera head 11102, the image processing unit 11412 of the CCU 11201, and the like, the mixing of colors between the adjacent pixels can be suppressed and a clearer surgical region image can be obtained, and thus the surgeon can reliably confirm the surgical region. Furthermore, by applying the technology according the present disclosure to the endoscope 11100, the image pickup unit 11402 of the camera head 11102, the image processing unit 11412 of the CCU 11201, and the like, the surgical region image can be obtained with lower latency, and thus treatment with a feeling similar to that in a case where the surgeon performs tactile observation of the surgical region can be performed.

Note that, here, the endoscopic surgery system has been described as an example, but the technology according to the present disclosure may be applied to, for example, a microscopic surgery system or the like.

<Application Example to Mobile Body>

The technology of the present disclosure (present technology) can be applied to various products. For example, the technology of the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 29:
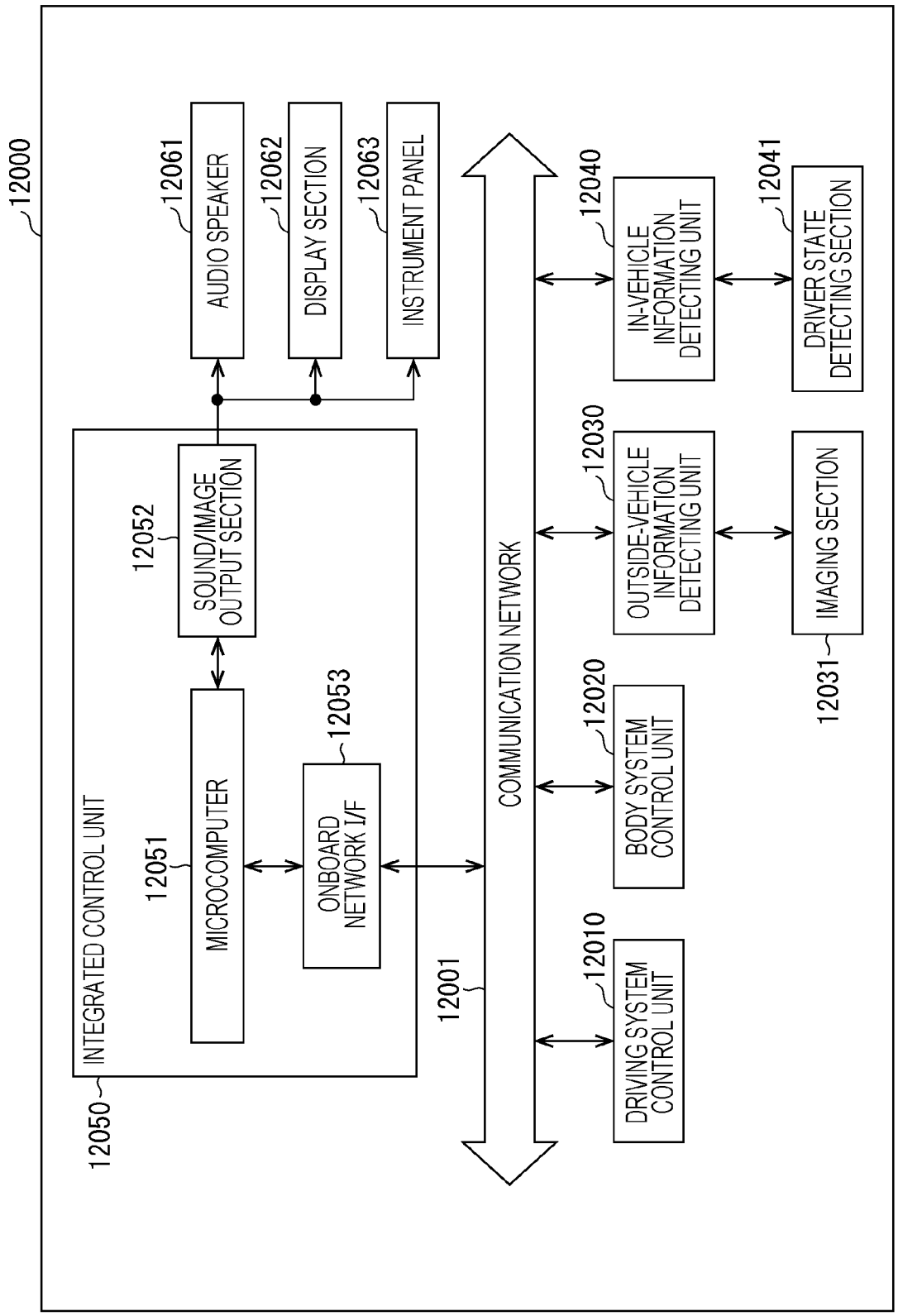
FIG. 29 is a block diagram illustrating a schematic configuration example of a vehicle control system as an example of a mobile body control system to which the technology according to the present disclosure can be applied.

FIG. 29 is a block diagram illustrating a schematic configuration example of a vehicle control system as an example of a mobile body control system to which the technology according to the present disclosure can be applied.

The vehicle control system 12000 includes a plurality of electronic control units connected to each other via a communication network 12001. In the example illustrated in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and an onboard network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of information about the outside of the vehicle acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example in FIG. 29, an audio speaker 12061, a display section 12062, and an instrument panel 12063 are exemplified as the output device. The display section 12062 may, for example, include at least one of an on-board display and a head-up display.

Figure 30:
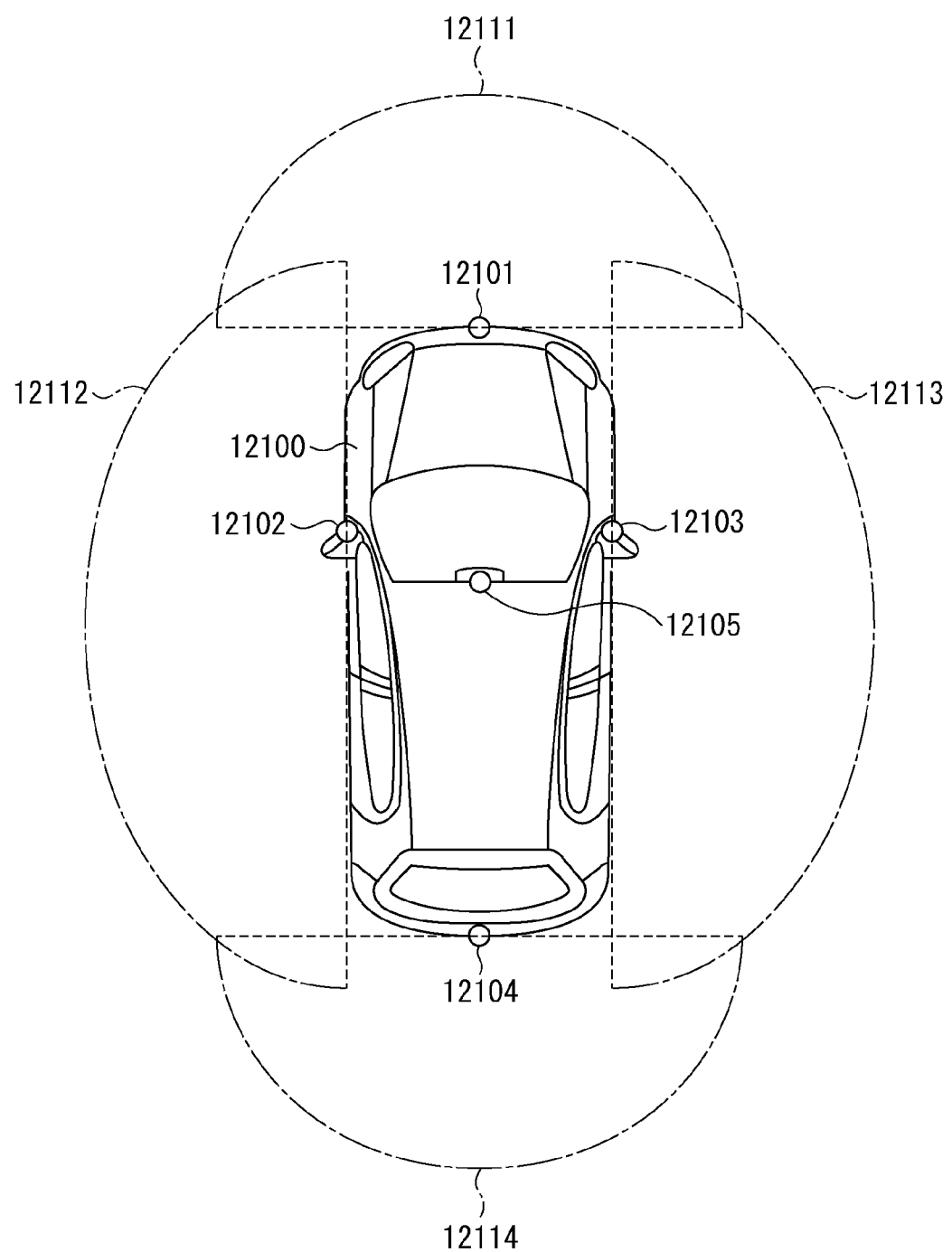
FIG. 30 is a diagram illustrating an example of an installation position of an imaging section.

FIG. 30 is a diagram illustrating an example of the installation position of the imaging section 12031.

In FIG. 30, a vehicle 12100 includes imaging sections 12101, 12102, 12103, 12104, and 12105 as the imaging section 12031.

The imaging sections 12101, 12102, 12103, 12104, and 12105 are, for example, provided at positions on a front nose, sideview mirrors, a rear bumper, a back door of the vehicle 12100, a position on an upper part of a windshield within the interior of the vehicle, and the like. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The images of the front obtained by the imaging sections 12101 and 12105 are used mainly to detect a preceding vehicle, a pedestrian, an obstacle, a signal, a traffic sign, a lane, or the like.

Note that FIG. 30 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology of the present disclosure can be applied has been described above. The technique according to the present disclosure can be applied to the imaging section 12031 and the like in the configuration described above. Specifically, the imaging device 1 described above can be applied to the imaging section 12031. By applying the technology according to the present disclosure to the imaging section 12031, the color mixing between the adjacent pixels can be suppressed and more easily viewable image can be obtained, and thus fatigue of the driver can be reduced.

OTHER EMBODIMENTS

As described above, the present disclosure has been described according to the embodiments and modified examples, but it should not be understood that the description and drawings forming a part of this disclosure limit the present disclosure.

Various alternative embodiments, examples, and operation techniques will be apparent to those skilled in the art from this disclosure. For example, in the integrated configuration part 10 illustrated in FIGS. 1 and 2, at least one of the glass substrate 12 and the IRCF 14 may be omitted as necessary. Furthermore, FIGS. 2, 6, 7, and 24 illustrate a mode in which one on-chip lens 11d is arranged in one pixel 32, but this is merely an example, and as illustrated in FIG. 8B and the like, one on-chip lens 11d may be arranged in four pixels 32 in plan view, and one on-chip lens 11d may be arranged in two pixels 32 in cross-sectional view.

As described above, it is needless to say that the present technology includes various embodiments and the like that are not described herein. At least one of various omissions, substitutions, and changes of the components may be made without departing from the gist of the above-described embodiments and modified examples. Furthermore, the effects described herein are merely examples and are not limited, and other effects may be provided.

Note that the present disclosure can also have the following configurations.

(1)

An imaging device including:
a semiconductor substrate;
a plurality of pixels provided on the semiconductor substrate and arranged side by side in a direction parallel to one surface of the semiconductor substrate;
an inter-pixel separation part provided on the semiconductor substrate and separating adjacent pixels among the plurality of pixels;
color filters provided on a side of the one surface of the semiconductor substrate;
a plurality of convex lenses provided on the side of the one surface of the semiconductor substrate with the color filters interposed between the plurality of convex lenses and the semiconductor substrate, and arranged side by side in the direction parallel to the one surface; and
a concave lens provided on the side of the one surface of the semiconductor substrate with the color filters and the plurality of convex lenses interposed between the concave lens and the semiconductor substrate, in which
the plurality of pixels includes:
a first color pixel in which a first color filter among the color filters is arranged;

a second color pixel in which a second color filter among the color filters is arranged; and a third color pixel in which a third color filter among the color filters is arranged, the inter-pixel separation part includes:

a same-color pixel separation part arranged between adjacent pixels of a same color among the first color pixel, the second color pixel, and the third color pixel; and a different-color pixel separation part arranged between adjacent pixels of different colors among the first color pixel, the second color pixel, and the third color pixel, and the different-color pixel separation part has a trench isolation structure.

(2)

The imaging device according to (1) described above, in which the same-color pixel separation part has the trench isolation structure in at least a part of the same-color pixel separation part.

(3)

The imaging device according to (1) or (2) described above, in which the trench isolation structure includes:

a trench provided in the semiconductor substrate; and a filling film embedded in the trench.

(4)

The imaging device according to (3) described above, in which the trench is open to the side of the one surface of the semiconductor substrate and has a bottom surface in the semiconductor substrate.

(5)

The imaging device according to (3) described above, in which the trench penetrates between the one surface of the semiconductor substrate and another surface located on an opposite side of the one surface.

(6)

The imaging device according to any one of (1) to (5) described above, in which the plurality of pixels includes:

a first color pixel group including four pixels in which the first color pixels are aligned two by two in a first direction and a second direction orthogonal to the first direction;

a second color pixel group including four pixels in which the second color pixels are aligned two by two in the first direction and the second direction; and a third color pixel group including four pixels in which the third color pixels are aligned two by two in the first direction and the second direction, and one of the convex lenses is arranged in each of the first color pixel group, the second color pixel group, and the third color pixel group.

(7)

The imaging device according to (6) described above, in which the first color pixel group, the second color pixel group, and the third color pixel group each have pixel groups of different colors arranged adjacent to each other in the first direction and the second direction.

(8)

The imaging device according to any one of (1) to (7) described above, further including:

a lens group that is arranged on an opposite side of the semiconductor substrate across the concave lens and allows light to enter the concave lens; and a holding unit that holds the lens group.

REFERENCE SIGNS LIST 1, 1001 Imaging device
5 Column signal processing circuit
10 Integrated configuration part
11, 1004 Solid-state imaging element
11a Lower substrate (Logic substrate)
11b Upper substrate (pixel sensor substrate)
11c Color filter
11d On-chip lens
11e Ball (Back electrode)
11e Ball
12 Glass substrate
13, 15, 25 Adhesive
16 Lens group
17 Circuit board
18 Actuator
19 Connector
20 Spacer
21 Pixel region
22 Control circuit
23 Logic circuit
29 Well layer
30 Wafer-level lens (WL lens)
30a Effective region
30b Non-effective region
32 pixel
32B Blue pixel
32BG Blue pixel group
32G Green pixel
32GG Green pixel group
32R Red pixel
32RG Red pixel group
33 Pixel array unit
34 Vertical drive circuit
35 Column signal processing circuit
36 Horizontal drive circuit
37 Output circuit
38 Control circuit
39 Input/output terminal
40 Pixel drive wiring line
41 Vertical signal line
42 Horizontal signal line
51 Photodiode
52 First transfer transistor
53 Memory unit
54 Second transfer transistor
56 Reset transistor
57 Amplifier transistor
58 Selection transistor
59 Discharge transistor
81, 101 Semiconductor substrate (silicon substrate)
82, 102 Multilayer wiring layer
83, 103, 103a, 103b, 103c Wiring layer
83a, 83b, 83c Wiring layer
84, 104 Interlayer insulating film
85 Silicon through hole
86, 107, 221, 230 Insulating film
87 Connection conductor
88, 109 Through silicon via
90 Rewiring line
91 Solder mask (Solder resist)
105 Through chip via
106 Connection wiring line
108 Planarization film (Insulating film)

216 Transfer gate electrode
217 Gate insulating film
218, 223, 224 P-type region
219, 219A Inter-pixel separation part
220 Insulating film (Fixed charge film)
221A Polysilicon film
222, 231 N-type region
225, 521 Light shielding film
229 Well layer
232 Back surface
233 Front surface
239, 239A Trench
351 Refractive film
401, 401G, 401H, 401I, 401J, 401K, 401L, 401M, 401N Lens
401a Protruding part
401b, 401b' Hem part
402 AR coating
1002 Optical system
1003 Shutter device
1005 Drive circuit
1006 Signal processing circuit
1007 Monitor
1008 Memory
2191 Same-color pixel separation part
2192 Different-color pixel separation part
10402 Image pickup unit
11000 Endoscopic surgery system
11100 Endoscope
11101 Lens barrel
11102 Camera head
11110 Surgical tool
11111 Pneumoperitoneum tube
11112 Energy device
11120 supporting arm apparatus
11131 Surgeon (Medical doctor)
11132 Patient
11133 Patient bed
11200 Cart
11201 Camera control unit
11202 Display apparatus
11203 Light source apparatus
11204 Inputting apparatus
11205 Treatment tool controlling apparatus
11206 Pneumoperitoneum apparatus
11207 Recorder
11208 Printer
11400 Transmission cable
11401 Lens unit
11402 Image pickup unit
11403 Driving unit
11404 Communication unit
11405 Camera head controlling unit
11411 Communication unit
11412 Image processing unit
11413 Control unit
12000 Vehicle control system
12001 Communication network
12010 Driving system control unit
12020 Body system control unit
12030 Outside-vehicle information detecting unit
12031 Image pickup unit
12040 In-vehicle information detecting unit
12041 Driver state detecting section
12050 Integrated control unit
12051 Microcomputer
12052 Sound/image output section
12061 Audio speaker
12062 Display section
12063 Instrument panel
12100 Vehicle
12101, 12102, 12103, 12104, 12105 Image pickup unit
12111, 12112, 12113, 12114 Imaging range
CCU11201 Image pickup unit
Er, Es Boundary structure
FD Second transfer transistor
I Onboard network
ICG Indocyanine green
OFG Discharge signal
Qs Saturated charge amount
RST Reset signal
SEL Selection signal
TRG, TRX Transfer signal
VDD Constant voltage source
Z331, Z332, Z333, Z334, Z335, Z336, Z337, Z338, Z351, Z352, Z371 End part
Z391, Z392, Z393, Z394, Z395 Region
Ze Range

The invention claimed is:

1. An imaging device comprising:
a semiconductor substrate;
a plurality of pixels provided on the semiconductor substrate and arranged side by side in a direction parallel to one surface of the semiconductor substrate;
an inter-pixel separation part provided on the semiconductor substrate and separating adjacent pixels among the plurality of pixels;
color filters provided on a side of the one surface of the semiconductor substrate;
a plurality of convex lenses provided on the side of the one surface of the semiconductor substrate with the color filters interposed between the plurality of convex lenses and the semiconductor substrate, and arranged side by side in the direction parallel to the one surface; and
a concave lens provided on the side of the one surface of the semiconductor substrate with the color filters and the plurality of convex lenses interposed between the concave lens and the semiconductor substrate, wherein
the plurality of pixels includes:
a first color pixel in which a first color filter among the color filters is arranged;
a second color pixel in which a second color filter among the color filters is arranged; and
a third color pixel in which a third color filter among the color filters is arranged,
the inter-pixel separation part includes:
a same-color pixel separation part arranged between adjacent pixels of a same color among the first color pixel, the second color pixel, and the third color pixel; and
a different-color pixel separation part arranged between adjacent pixels of different colors among the first color pixel, the second color pixel, and the third color pixel, and
the different-color pixel separation part has a trench isolation structure.

2. The imaging device according to claim 1, wherein the same-color pixel separation part has the trench isolation structure in at least a part of the same-color pixel separation part.

3. The imaging device according to claim 1, wherein the trench isolation structure includes:
a trench provided in the semiconductor substrate; and
a filling film embedded in the trench.

4. The imaging device according to claim 3, wherein the trench is open to the side of the one surface of the semiconductor substrate and has a bottom surface in the semiconductor substrate.

5. The imaging device according to claim 3, wherein the trench penetrates between the one surface of the semiconductor substrate and another surface located on an opposite side of the one surface.

6. The imaging device according to claim 1, wherein the plurality of pixels includes:
a first color pixel group including four pixels in which the first color pixels are aligned two by two in a first direction and a second direction orthogonal to the first direction;
a second color pixel group including four pixels in which the second color pixels are aligned two by two in the first direction and the second direction; and
a third color pixel group including four pixels in which the third color pixels are aligned two by two in the first direction and the second direction, and
one of the convex lenses is arranged in each of the first color pixel group, the second color pixel group, and the third color pixel group.

7. The imaging device according to claim 6, wherein the first color pixel group, the second color pixel group, and the third color pixel group each have pixel groups of different colors arranged adjacent to each other in the first direction and the second direction.

8. The imaging device according to claim 1, further comprising:
a lens group that is arranged on an opposite side of the semiconductor substrate across the concave lens and allows light to enter the concave lens; and
a holding unit that holds the lens group.

* * * * *